(12) United States Patent
Bright et al.

(10) Patent No.: US 11,971,228 B2
(45) Date of Patent: Apr. 30, 2024

(54) INTERCOOLER ASSEMBLY

(71) Applicant: Whipple Industries, Inc., Fresno, CA (US)

(72) Inventors: Garrett Wayne Bright, Clovis, CA (US); Dustin E. Whipple, Fresno, CA (US); Yehoram Hofman, Newport Coast, CA (US)

(73) Assignee: WHIPPLE INDUSTRIES, INC., Fresno, CA (US)

( * ) Notice: Subject to any disclaimer, the term of this patent is extended or adjusted under 35 U.S.C. 154(b) by 682 days.

(21) Appl. No.: 16/872,085

(22) Filed: May 11, 2020

(65) Prior Publication Data

US 2020/0271396 A1 Aug. 27, 2020

Related U.S. Application Data

(63) Continuation-in-part of application No. 16/265,075, filed on Feb. 1, 2019, now Pat. No. 10,648,400, which
(Continued)

(51) Int. Cl.
*F28F 9/00* (2006.01)
*F02B 29/04* (2006.01)
(Continued)

(52) U.S. Cl.
CPC .......... *F28F 9/001* (2013.01); *F02B 29/0406* (2013.01); *F02B 29/0475* (2013.01);
(Continued)

(58) Field of Classification Search
CPC . F28F 9/001; F28F 2009/004; F02B 29/0406; F28D 7/1692; F01P 2003/182
(Continued)

(56) References Cited

U.S. PATENT DOCUMENTS 6,029,637 A 2/2000 Prior
6,129,056 A 10/2000 Skeel et al.
(Continued)

FOREIGN PATENT DOCUMENTS

JP 2007309172 A 11/2007

OTHER PUBLICATIONS

International Search Report and Written Opinion in corresponding application PCT/US2019/027973 dated Aug. 5, 2019 (11 pages).

*Primary Examiner* — Lindsay M Low
*Assistant Examiner* — Omar Morales
(74) *Attorney, Agent, or Firm* — Procopio, Cory, Hargreaves & Savitch LLP

(57) ABSTRACT

An intercooler lid assembly for an intercooler supercharger system comprising an intercooler lid mountable to a supercharger housing; one or more intercooler cores mounted within the intercooler lid; wherein the one or more intercooler cores configured to receive and cool supercharger air passing there through prior to receipt by an engine, the one or more intercooler cores are mounted to and within the intercooler lid to form a pre-assembled intercooler lid assembly mountable onto the supercharger housing to install the intercooler lid assembly, and the one or more intercooler cores configured to provide heat exchange fluid transfer there through to cool the supercharger air.

10 Claims, 26 Drawing Sheets

Related U.S. Application Data is a continuation-in-part of application No. 16/155,753, filed on Oct. 9, 2018, now Pat. No. 10,738,683.

(60) Provisional application No. 62/663,409, filed on Apr. 27, 2018.

(51) Int. Cl.
  *F28D 7/16* (2006.01)
  *F01P 3/18* (2006.01)

(52) U.S. Cl.
  CPC ...... *F28D 7/1692* (2013.01); *F01P 2003/182* (2013.01); *F28F 2009/004* (2013.01)

(58) Field of Classification Search
  USPC .......................................... 165/162
  See application file for complete search history.

(56) References Cited

U.S. PATENT DOCUMENTS

| | | |
|---|---|---|
| 6,227,179 B1 | 5/2001 | Eiermann et al. |
| 9,583,481 B2 | 2/2017 | Chu et al. |
| 9,664,152 B2 | 5/2017 | Zoner et al. |
| 9,683,481 B1 | 6/2017 | Magana et al. |
| 9,890,692 B1 | 2/2018 | Turnage |
| 2005/0139198 A1 | 6/2005 | Park |
| 2007/0107704 A1 | 5/2007 | Billings et al. |
| 2010/0258096 A1 | 10/2010 | Frank et al. |
| 2012/0017877 A1* | 1/2012 | Laube ................. F02B 29/0412 165/104.19 |
| 2012/0167860 A1 | 7/2012 | Wong et al. |
| 2017/0218891 A1 | 8/2017 | Zoner et al. |
| 2017/0350310 A1* | 12/2017 | Magana .............. F02B 29/0418 |
| 2019/0310032 A1* | 10/2019 | Nishiyama .............. F02B 29/04 |

* cited by examiner

```
┌─────────────────────────────────────────────────────────────────────────────────────┐
│      pre-assembling the one or more intercooler cores substantially entirely within │
│ the intercooler lid by disposing the one or more intercooler lid upside down,       │
│ lowering the one or more intercooler cores substantially entirely within the        │
│ intercooler lid, and coupling the one or more intercooler cores to the intercooler  │
│ lid within the intercooler lid to form the pre-assembled intercooler lid assembly   │
└─────────────────────────────────────────────────────────────────────────────────────┘
                                          ↓
┌─────────────────────────────────────────────────────────────────────────────────────┐
│      mounting the pre-assembled intercooler lid assembly onto the supercharger      │
│ housing to install the pre-assembled intercooler lid assembly                       │
└─────────────────────────────────────────────────────────────────────────────────────┘
                                          ↓
``` the one or more intercooler cores include a single intercooler core configured to receive and cool supercharger air upon a first pass there through and receive and further cool the supercharger air upon a second pass through the single intercooler core prior to receipt by an engine the single intercooler core includes a dual-pass heat exchanger path central section and spaced single-pass heat exchanger path outer sections that are spaced from each other by the dual-pass heat exchanger path central section the single intercooler core includes opposite sides, a front end with a central section including a single core heat exchange medium inlet port, and a rear end with a pair of core heat exchange medium outlet ports adjacent to the opposite sides the single intercooler core includes opposite sides, a rear end with a central section including a single core heat exchange medium inlet port, and a front end with a pair of core heat exchange medium outlet ports adjacent to the opposite sides the single intercooler core includes a single-pass heat exchanger path central section and spaced dual-pass heat exchanger path outer sections that are spaced from each other by the single-pass heat exchanger path central section the single intercooler core includes opposite sides, a front end with a central section including a single core heat exchange medium outlet port, and a rear end with a pair of core heat exchange medium inlet ports adjacent to the opposite sides the single intercooler core includes opposite sides, a rear end with a central section including a single core heat exchange medium outlet port, and a front end with a pair of core heat exchange medium inlet ports adjacent to the opposite sides the single intercooler core includes a lower section that heat exchanger fluid flows through in one direction and an upper section that heat exchanger fluid flows through in an opposite direction

FIG. 14

INTERCOOLER ASSEMBLY

CROSS REFERENCE TO RELATED APPLICATION

This application is a continuation-in-part of U.S. patent application Ser. No. 16/265,075, filed on Feb. 1, 2019, which is a continuation-in-part of U.S. patent application Ser. No. 16/155,753, filed on Oct. 9, 2018, and claims priority to U.S. provisional patent application No. 62/663,409, filed on Apr. 27, 2018. All of these patent applications are incorporated by reference herein.

FIELD OF THE INVENTION

The present invention is related to intercooler supercharger systems and methods.

BACKGROUND OF THE INVENTION

Intercooler supercharger systems have been developed in the past to obtain additional power from an engine. A supercharger delivers additional air so that a vehicle engine can burn additional fuel. The additional air is provided by compressing the air with the supercharger before it enters the engine. When the air is compressed, however, the temperature of the air rises. Higher-temperature air is less dense and more volatile. An intercooler has been used between the supercharger and the engine to cool the compressed air to the desired temperature before injecting it into the engine.

SUMMARY OF THE INVENTION

An aspect of the invention involves a dual, dual-pass intercooler assembly for an intercooler supercharger system comprising an intercooler lid mountable to a supercharger housing; a pair of intercooler cores coupled mountable to and within at least one of the intercooler lid and the supercharger housing; wherein the pair of intercooler cores configured to receive and cool supercharger air upon a first pass through the pair of intercooler cores and receive and further cool the supercharger air upon a second pass through the pair of intercooler cores prior to receipt by an engine.

One or more implementations of the aspect of the invention described immediately above include one or more of the following: the pair of intercooler cores each include a heat exchange medium inlet and a heat exchange medium outlet; the intercooler lid includes a pair of lid heat exchange medium inlets and a pair of heat exchange medium outlets that are in communication with the heat exchange medium inlet and a heat exchange medium outlet of the pair of intercooler cores; the pair of intercooler cores are mounted to and within the intercooler lid to form a pre-assembled intercooler lid assembly mountable onto the supercharger housing to install the intercooler lid assembly; the pair of intercooler cores are mountable above the supercharger housing; and/or the pair of intercooler cores are mountable below the supercharger housing; the pair of intercooler cores are identical or substantially similar.

Another aspect of the invention involves a method of installing the dual, dual-pass intercooler assembly of the aspect of the invention described above comprising: pre-assembling the pair of intercooler cores within the intercooler lid and coupling the pair of intercooler cores to the intercooler lid within the intercooler lid; mounting the intercooler lid assembly onto the supercharger housing to install the intercooler lid assembly.

One or more implementations of the aspect of the invention described immediately above include one or more of the following: the pair of intercooler cores each include a heat exchange medium inlet and a heat exchange medium outlet; the intercooler lid includes a pair of lid heat exchange medium inlets and a pair of heat exchange medium outlets that are in communication with the heat exchange medium inlet and a heat exchange medium outlet of the pair of intercooler cores when the pair of intercooler cores are pre-assembled within the intercooler lid; the pair of intercooler cores are mounted above the supercharger housing; and/or the pair of intercooler cores are identical or substantially similar.

Another aspect of the invention involves an intercooler lid assembly for an intercooler supercharger system comprising an intercooler lid mountable to a supercharger housing; one or more intercooler cores mounted within the intercooler lid; wherein the one or more intercooler cores configured to receive and cool supercharger air passing there through prior to receipt by an engine, the one or more intercooler cores are mounted to and within the intercooler lid to form a pre-assembled intercooler lid assembly mountable onto the supercharger housing to install the intercooler lid assembly, and the one or more intercooler cores configured to provide heat exchange fluid transfer there through to cool the supercharger air.

One or more implementations of the aspect of the invention described immediately above include one or more of the following: the one or more intercooler cores include a single intercooler core configured to receive and cool supercharger air upon a first pass there through and receive and further cool the supercharger air upon a second pass through the single intercooler core prior to receipt by an engine; the single intercooler core includes a dual-pass heat exchanger path central section and spaced single-pass heat exchanger path outer sections that are spaced from each other by the dual-pass heat exchanger path central section; the single intercooler core includes opposite sides, a front end with a central section including a single core heat exchange medium inlet port, and a rear end with a pair of core heat exchange medium outlet ports adjacent to the opposite sides; the single intercooler core includes opposite sides, a rear end with a central section including a single core heat exchange medium inlet port, and a front end with a pair of core heat exchange medium outlet ports adjacent to the opposite sides; the single intercooler core includes a single-pass heat exchanger path central section and spaced dual-pass heat exchanger path outer sections that are spaced from each other by the dual-pass heat exchanger path central section; the single intercooler core includes opposite sides, a front end with a central section including a single core heat exchange medium outlet port, and a rear end with a pair of core heat exchange medium inlet ports adjacent to the opposite sides; the single intercooler core includes opposite sides, a rear end with a central section including a single core heat exchange medium outlet port, and a front end with a pair of core heat exchange medium inlet ports adjacent to the opposite sides; the single intercooler core includes a lower section that heat exchanger fluid flows through in one direction and an upper section that heat exchanger fluid flows through in an opposite direction.

Another aspect of the invention involves a method of installing the intercooler assembly according to the aspect of the invention recited further above, comprising pre-assembling the one or more intercooler cores substantially entirely within the intercooler lid by disposing the one or more intercooler lid upside down, lowering the one or more intercooler cores substantially entirely within the intercooler lid, and coupling the one or more intercooler cores to the intercooler lid within the intercooler lid to form the pre-assembled intercooler lid assembly; mounting the pre-assembled intercooler lid assembly onto the supercharger housing to install the pre-assembled intercooler lid assembly.

One or more implementations of the aspect of the invention described immediately above include one or more of the following: the one or more intercooler cores include a single intercooler core configured to receive and cool supercharger air upon a first pass there through and receive and further cool the supercharger air upon a second pass through the single intercooler core prior to receipt by an engine; the single intercooler core includes a dual-pass heat exchanger path central section and spaced single-pass heat exchanger path outer sections that are spaced from each other by the dual-pass heat exchanger path central section; the single intercooler core includes opposite sides, a front end with a central section including a single core heat exchange medium inlet port, and a rear end with a pair of core heat exchange medium outlet ports adjacent to the opposite sides; the single intercooler core includes opposite sides, a rear end with a central section including a single core heat exchange medium inlet port, and a front end with a pair of core heat exchange medium outlet ports adjacent to the opposite sides; the single intercooler core includes a single-pass heat exchanger path central section and spaced dual-pass heat exchanger path outer sections that are spaced from each other by the single-pass heat exchanger path central section; the single intercooler core includes opposite sides, a front end with a central section including a single core heat exchange medium outlet port, and a rear end with a pair of core heat exchange medium inlet ports adjacent to the opposite sides; the single intercooler core includes opposite sides, a rear end with a central section including a single core heat exchange medium outlet port, and a front end with a pair of core heat exchange medium inlet ports adjacent to the opposite sides; and/or the single intercooler core includes a lower section that heat exchanger fluid flows through in one direction and an upper section that heat exchanger fluid flows through in an opposite direction.

BRIEF DESCRIPTION OF DRAWINGS

FIG. 14 is a flow chart of an exemplary method of installing an intercooler assembly.

DETAILED DESCRIPTION OF THE INVENTION

Figure 1:
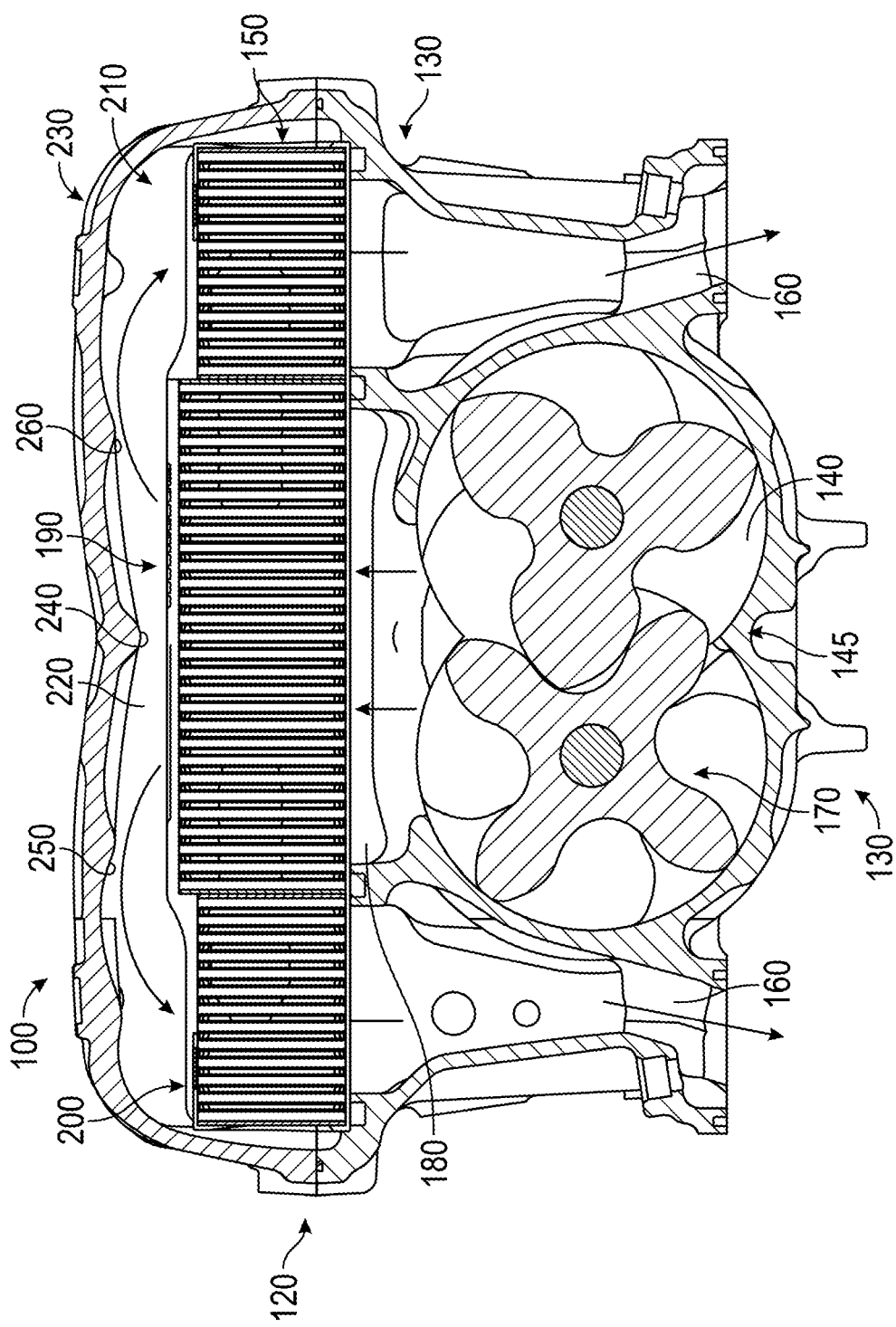
FIG. 1 is a perspective view of an embodiment of an intercooler lid assembly for a housing of an intercooler supercharger system.

With reference to FIGS. 1-4F, an embodiment of an intercooler lid assembly 100 for an intercooler supercharger system 120 will be described after first describing the intercooler supercharger system 120.

The intercooler supercharger system 120 includes a housing 130 that encloses and directs air from a supercharger chamber 140 of a supercharger 145 to an intercooler assembly 150 and out the runners 160 to the engine (not shown).

The supercharger chamber 140 houses a rotor assembly 170. The supercharger 145 compresses the air to the engine by controlling a rate differential from the air intake through the rotor assembly 170 to air exhaust to the engine. In alternative embodiments, other compressor devices and configurations may be used such as, but not limited to, a screw compressor.

As shown by the arrows, the air leaving the supercharger 145 enters a central chamber 180 and is directed through the intercooler assembly 150. The intercooler assembly 150 includes a plurality of separate intercooler cores 190, 200, 210. The supercharger air traverses the central intercooler core 190 and enters lid chamber 220, which is disposed between the intercooler assembly 150 and a lid 230. Together, the plurality of intercooler cores 190, 200, 210 and the lid 230 form the intercooler lid assembly 100. Air entering the lid chamber 220 is directed by a central rib 240 and side ribs 250, 260 (along with a curved interior surface of the lid 230) to and through the side intercooler cores 200, 210. Then, the cooled air travels along the runners 160 to the engine.

Figure 2A:
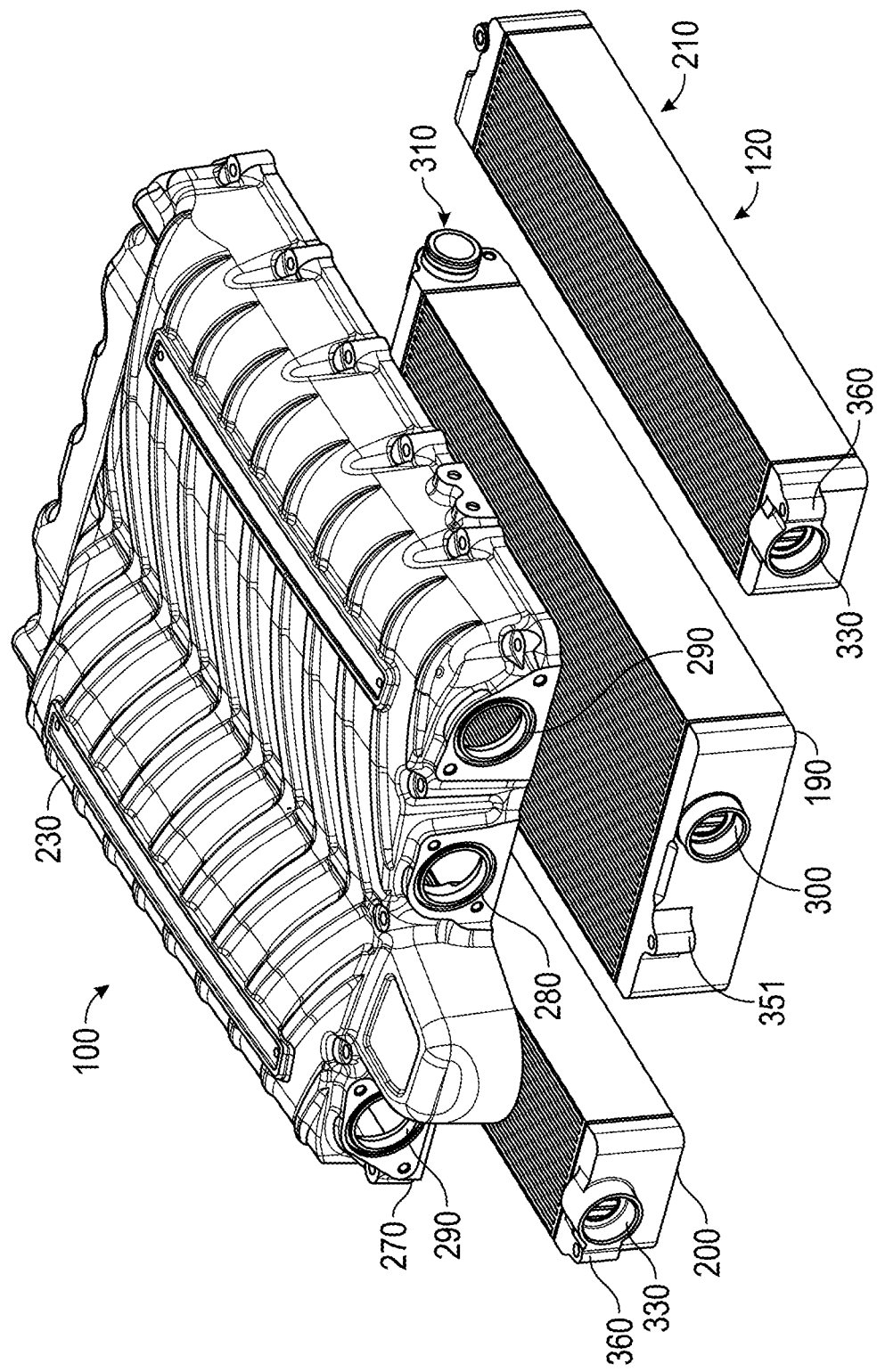
FIG. 2A is top perspective view of the intercooler lid assembly of FIG. 1.
Figure 2B:
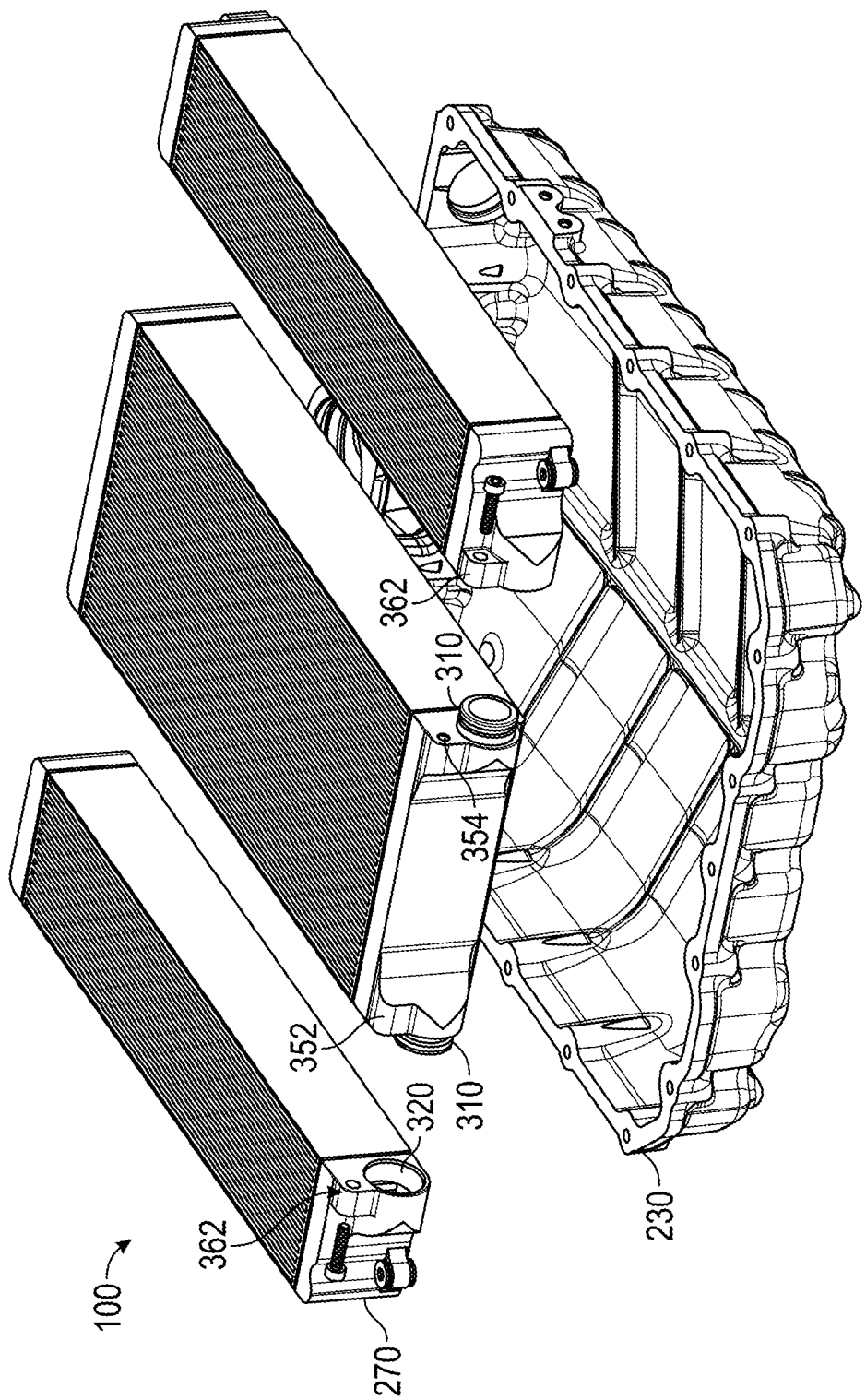
FIG. 2B is bottom perspective view of the intercooler lid assembly of FIG. 1.
Figure 3A:
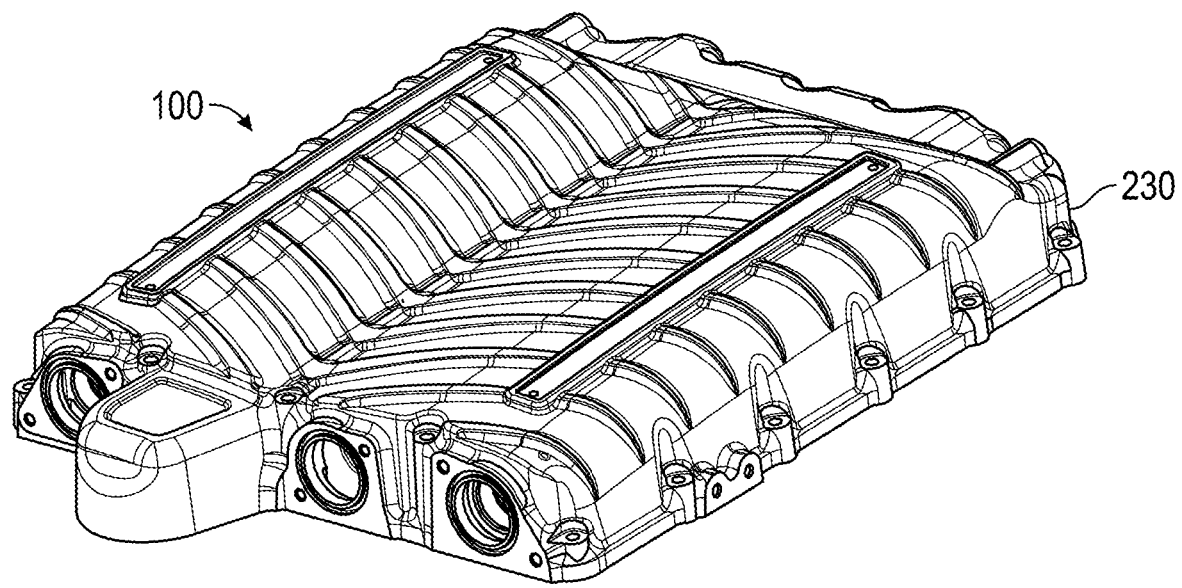
FIG. 3A is top perspective view of the intercooler lid assembly of FIG. 1 with a plurality of separate intercooler cores shown mounted within and to the lid.
Figure 3B:
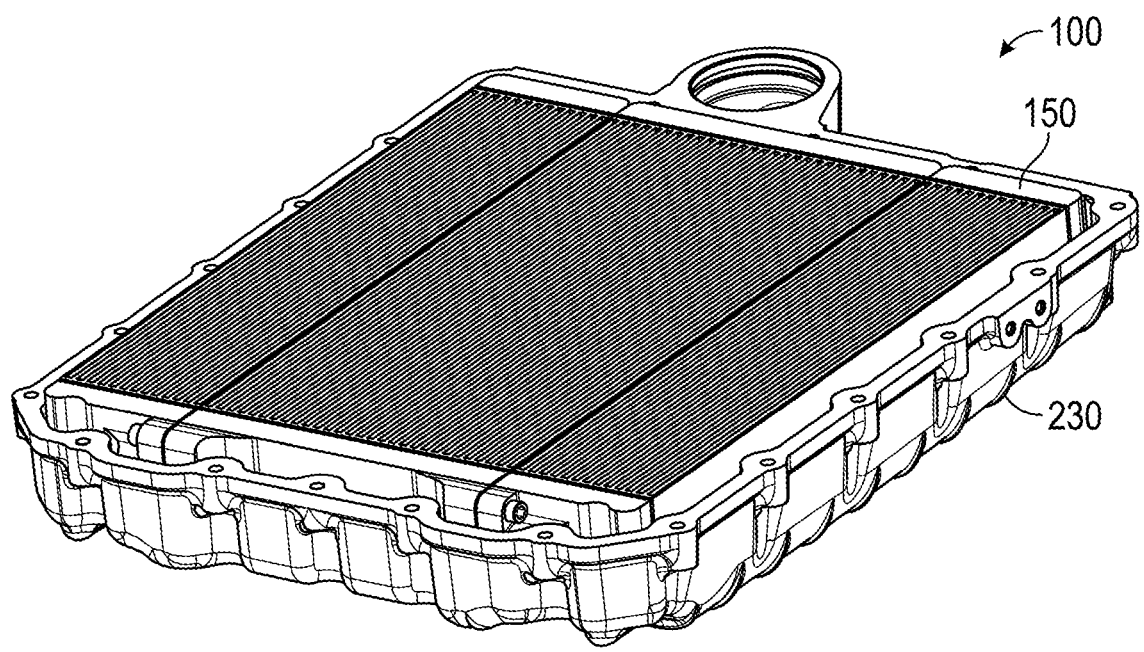
FIG. 3B is a bottom perspective view of the intercooler lid assembly of FIG. 3A.
Figure 4A:
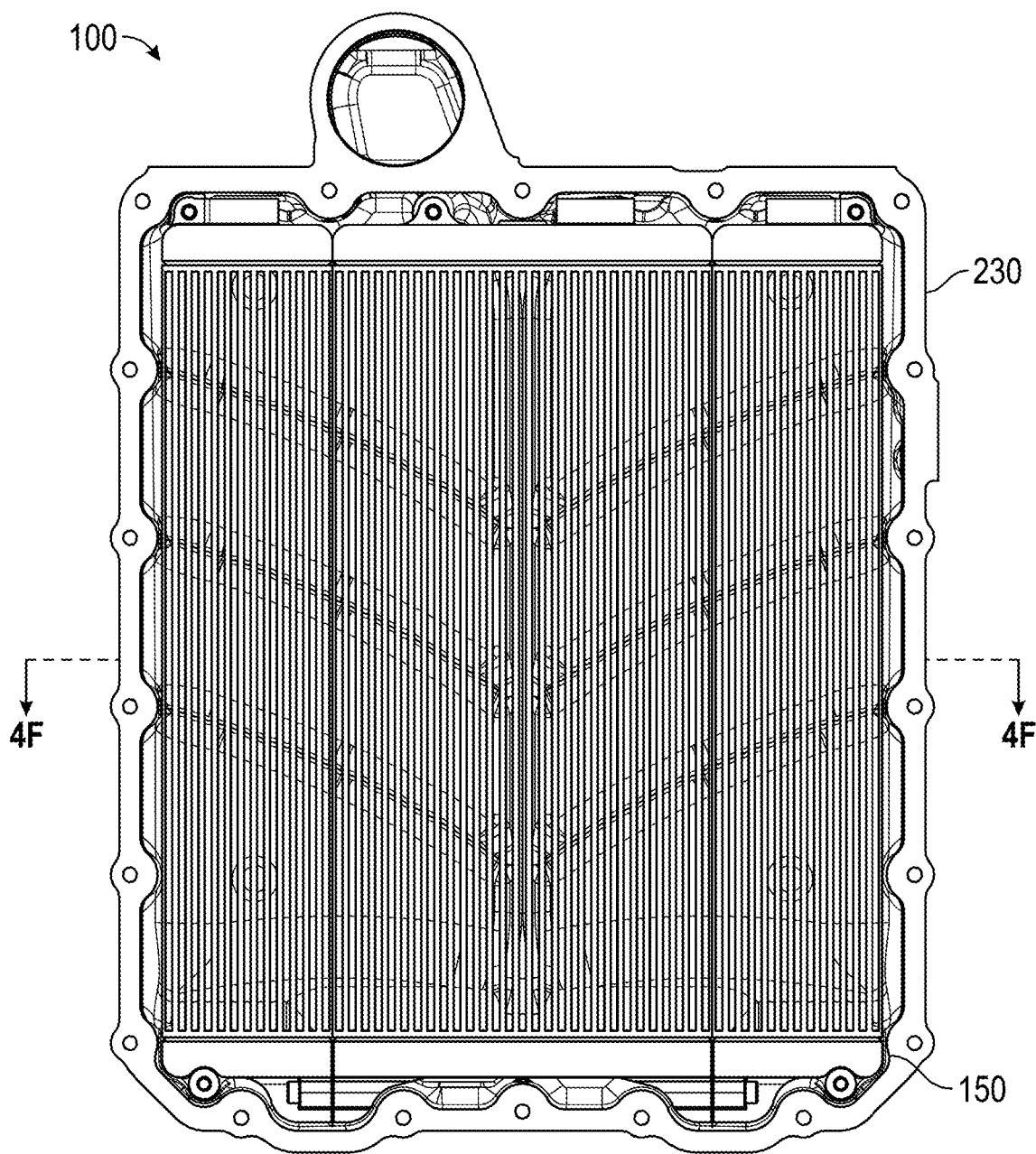
FIG. 4A is a top plan view of the intercooler lid assembly of FIG. 3A.
Figure 4B:
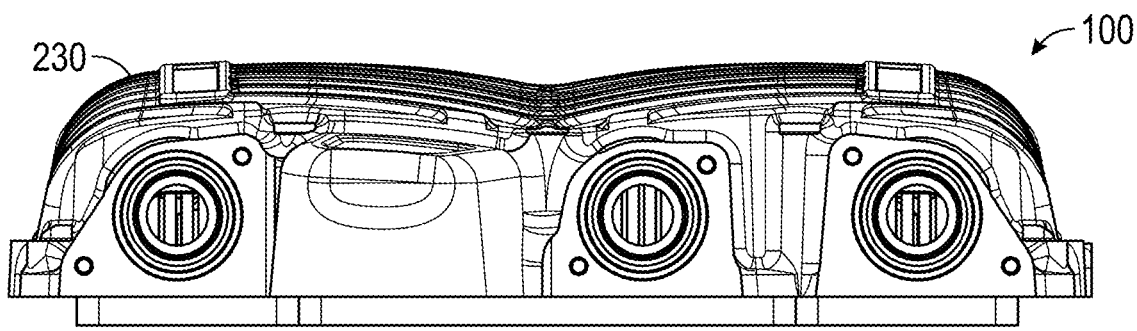
FIG. 4B is a front elevational view of the intercooler lid assembly of FIG. 4A.
Figure 4C:
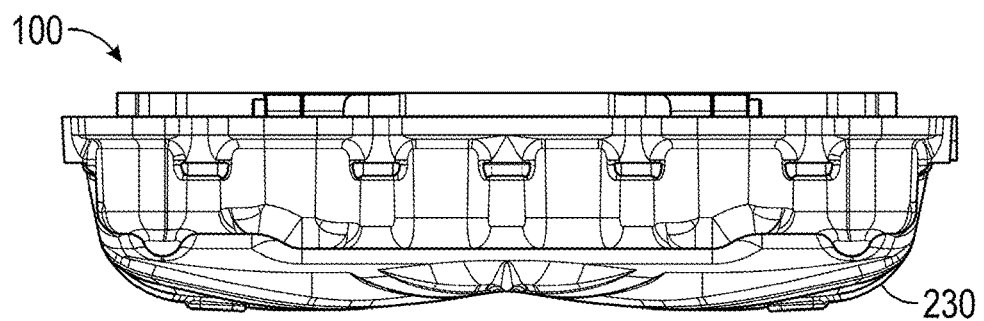
FIG. 4C is a rear elevational view of the intercooler lid assembly of FIG. 4A.
Figures 4D, 4E:
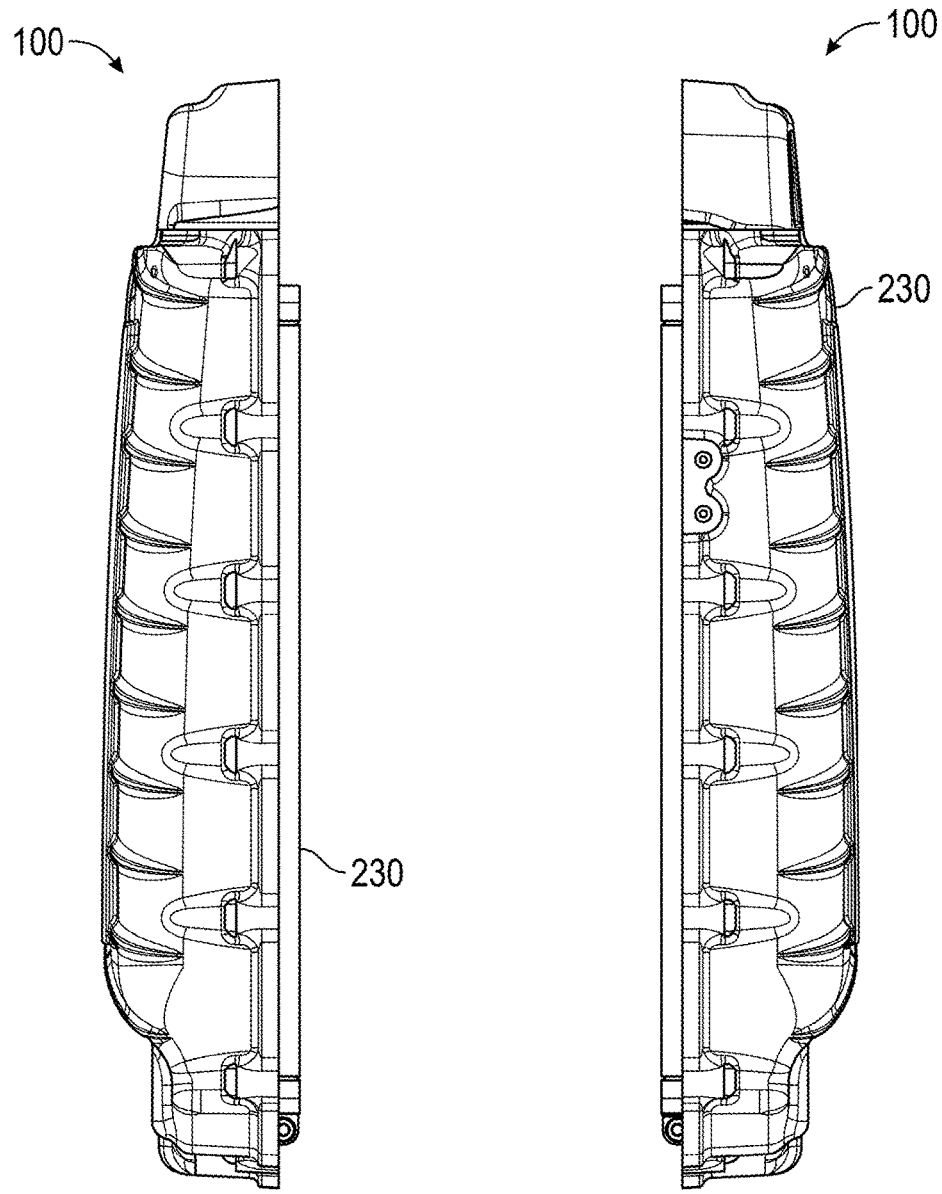
FIG. 4D is a left side elevational view of the intercooler lid assembly of FIG. 4A.
FIG. 4E is a right side elevational view of the intercooler lid assembly of FIG. 4A.
Figure 4F:
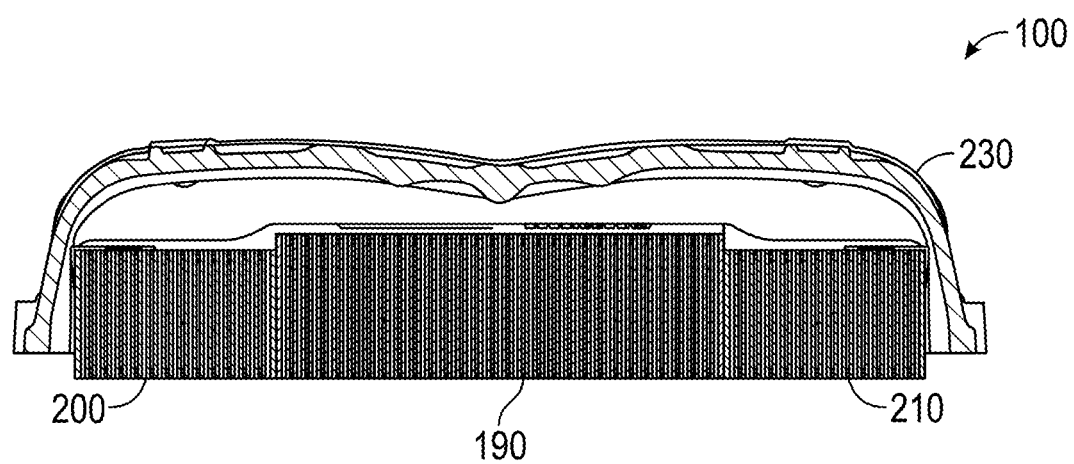
FIG. 4F is a cross-sectional elevational view of the intercooler lid assembly of FIG. 4A taken along lines 4F-4F.
Figure 12:
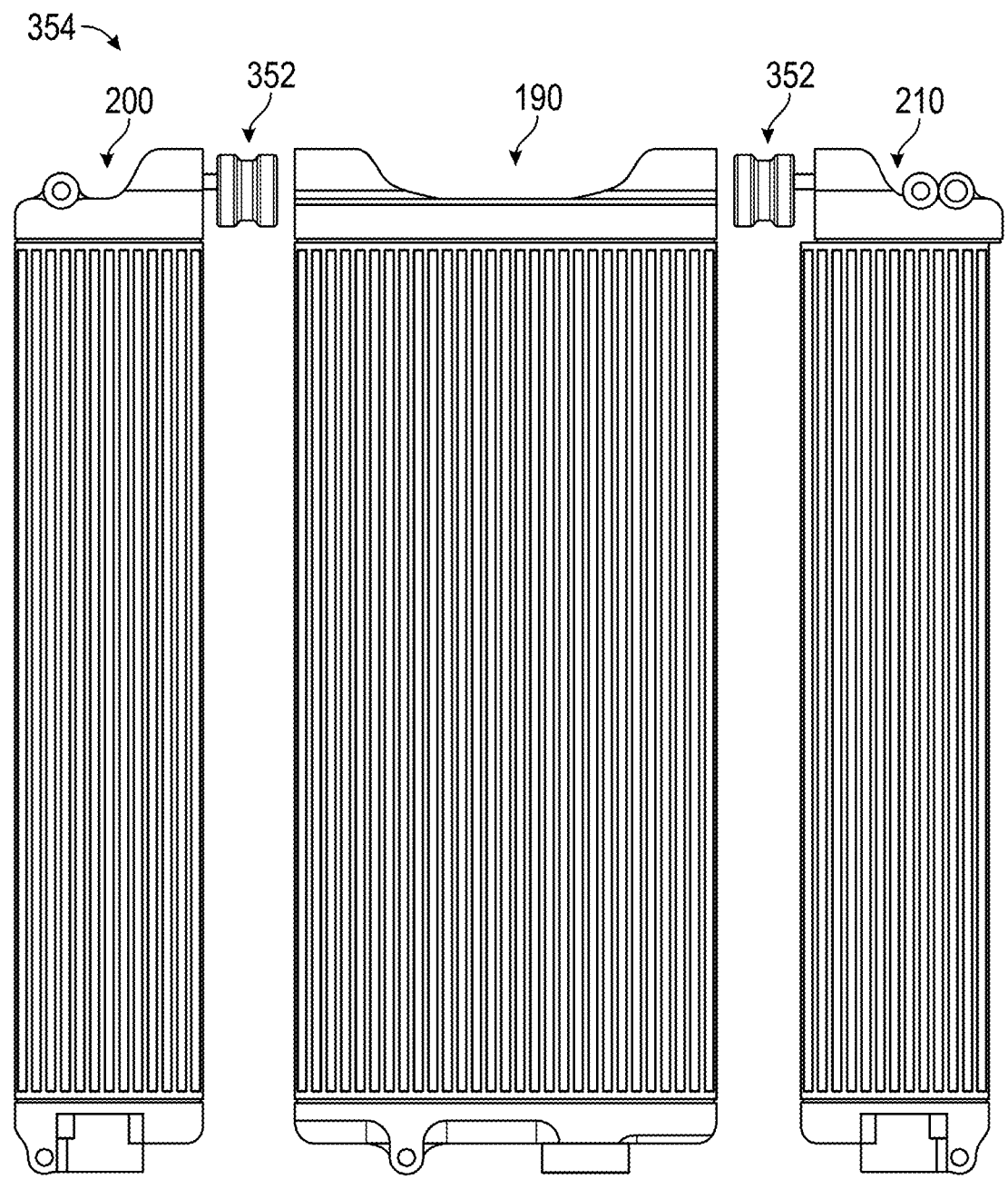
FIG. 12 is a top exploded view of an embodiment of an intercooler assembly similar to the intercooler assemblies shown in FIGS. 1-4F, except small connecting tubes/dog bones are used to couple individual cores into a single large intercooler assembly.

With reference to FIGS. 2A and 2B, the intercooler lid assembly 100 includes a heat exchange medium system 270 for transferring a heat exchange medium (e.g., water) there through for cooling the compressed air that passes through the intercooler assembly 150. The heat exchange medium system 270 includes a lid heat exchange medium inlet 280 and lid heat exchange medium outlets 290. The central intercooler core 190 includes a heat exchange medium inlet 300 coupled with the lid heat exchange medium inlet 280, and a heat exchange medium outlets 310 in communication with the inlet 300 through a fluid path (not shown). The side intercooler core 200 includes a heat exchange medium inlet 320 coupled with one of the heat exchange medium outlets 310, and a heat exchange medium outlet 330 in communication with the inlet 320 through a fluid path (not shown) and coupled with one of the lid heat exchange medium outlets 290. The side intercooler core 210 includes a heat exchange medium inlet 340 coupled with one of the heat exchange medium outlets 310, and a heat exchange medium outlet 350 in communication with the inlet 340 through a fluid path (not shown) and coupled with one of the lid heat exchange medium outlets 290. In the embodiment shown, the heat exchange medium outlets 310 and the heat exchange medium inlets 320, 340 are coupled together with dog-bone type joints. In alternative embodiments, the heat exchange medium outlets 310 and the heat exchange medium inlets 320, 340 are coupled together with radial o-ring seal(s), o-ring face seal(s), gasketed face seal(s), or other connectors/seals. For example, but not by way of limitation, FIG. 12 illustrates an embodiment of an intercooler assembly where small connecting tubes/dog bones 352 are used to couple individual cores 190, 200, 210 together into a single large intercooler assembly 354.

The central intercooler core 190 includes connection flanges 351, 352, 354 and the side intercooler cores 200, 210 include connection flanges 360, 362. Fasteners (e.g., bolts) are used to mount the central intercooler core 190 and the side intercooler cores 200, 210 to each other, and to and within the lid 230 through the connection flange 350 and the connection flanges 360. FIGS. 3A through 4C show the central intercooler core 190 and the side intercooler cores 200, 210 mounted to and within the lid 230 to form the intercooler lid assembly 100.

In use, the intercooler lid assembly 100 is pre-assembled with the central intercooler core 190 and the side intercooler cores 200, 210 coupled together and mounted to and within the lid 230 to form the intercooler lid assembly 100 in the manner described with respect to FIGS. 2A and 2B. During installation, a user simply mounts/installs the intercooler lid assembly 100 to install the intercooler assembly.

Advantages of the intercooler lid assembly 100 include, among other advantages:

1. End user does not need to install the intercooler assembly, which is such a critical piece of the intercooler supercharger system, during installation. The intercooler assembly 150 is pre-assembled in the lid 230 and customer simply installs the lid 230 onto the housing 130 to install the intercooler assembly. Prior designs and intercooler assembly installations were much more time-consuming and complicated.
2. Simple water distribution amongst cores. Prior designs required external water lines to transfer water from core to core. In the intercooler lid assembly 100, the heat exchange medium connections are built in, attaching with a dog bone type joint(s), radial o-ring seal(s), o-ring face seal(s), gasketed face seal(s), or other connectors/seals.
3. Easy to change in packaging; core depth can be varied significantly easier.
4. Better flowing intake runners that prior designs, which is limited in runner shape, hurting efficiency.
5. Easy access to cores. One can simply remove the lid 230 and service/inspect cores 190, 200, 210. Prior designs required one to remove the entire supercharger assembly.
6. Packaging advantage, by being on top vs on side, the intercooler lid assembly 100 maximizes surface area of the intercooler vs a wide supercharger (cores on the side), which limits the ability to fit port injection into the lower portion of the manifold and, in some cases, cannot fit on the engine due to the width.
7. Increased airflow capacity. The runner section is the smallest area. Putting a core in this area limits airflow capacity through the intercooler core. By being on top of the runners, the intercooler lid assembly 100 provides room to increase surface area, lowering pressure loss.

With reference to FIGS. 5-8, an embodiment of a dual, dual-pass intercooler assembly 400 of an intercooler supercharger system 410 will be described. Elements in the intercooler supercharger system 410 that are similar to elements in the intercooler supercharger system 120 shown and/or described with respect to FIGS. 1-4 will be shown and/or described with like reference numbers, but with an "a" suffix.

Figure 8:
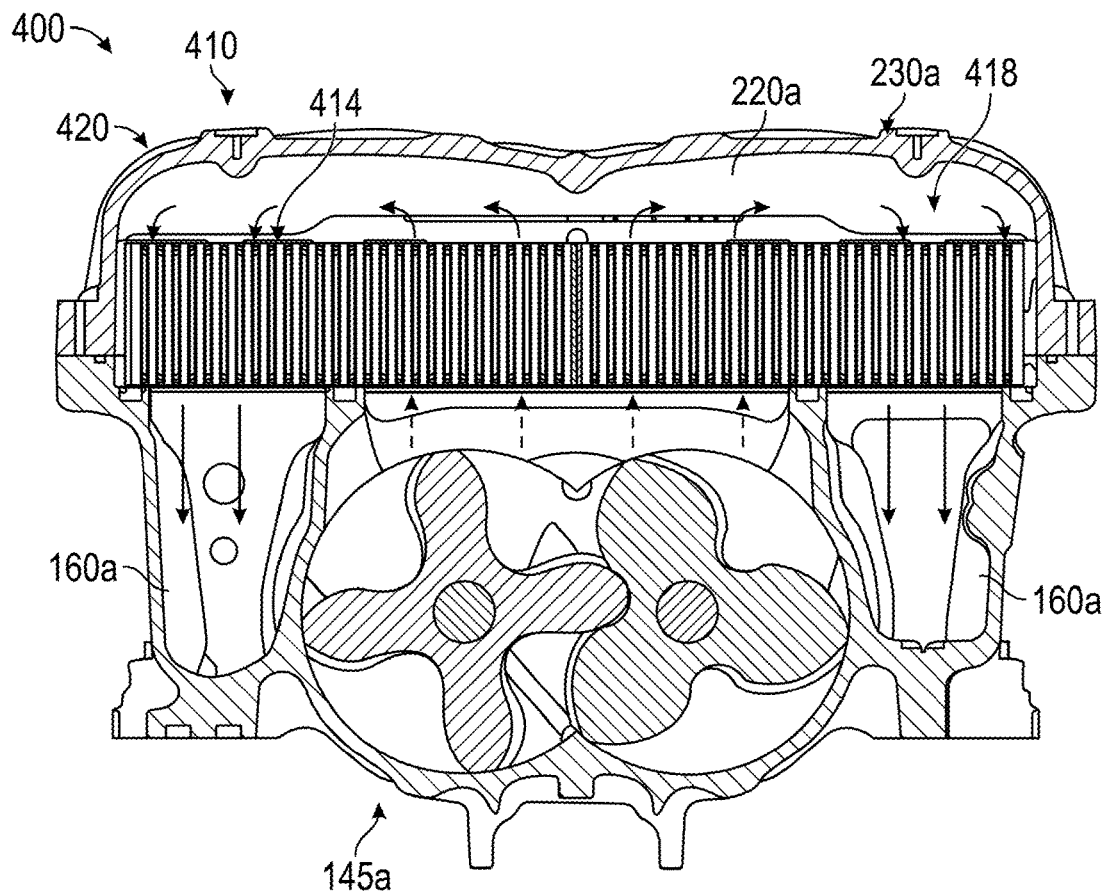
FIG. 8 is cross-sectional view of the dual, dual-pass intercooler assembly of an intercooler supercharger system of FIG. 5.

The dual, dual-pass intercooler assembly 400 includes a pair of separate intercooler cores 414, 418. As shown in FIG. 8, the supercharger air traverses the pair of intercooler cores 414, 418 and enters the lid chamber 220a, which is disposed between the intercooler assembly 410 and the lid 230a. In the embodiment shown, together, the pair of intercooler cores 414, 418 and the lid 230 form a dual, dual-pass intercooler lid assembly 420. In an alternative embodiment, the intercooler assembly 400 is separate from the lid 230a and/or the intercooler assembly 400 is mounted differently than that shown/described. The air flow through the dual, dual-pass intercooler assembly 400 is similar to the air flow through the intercooler assembly 150 shown and/or described with respect to FIG. 1, but compared to the intercooler assembly 150, the dual, dual-pass intercooler assembly 400 has one less leak path for the air to go by un-intercooled, has one less leak path (or dog bone) to potentially leak in the engine, is less expensive to manufacture, including less assembly time and reduces part count from three to one because the pair of left/right intercooler cores 414, 418 can be made to be identical or substantially similar). Compared to the intercooler assembly of U.S. Pat. No. 9,683,481, the dual, dual-pass intercooler assembly 400 has greater water flow because the dual, dual-pass intercooler assembly 400 has two heat exchanger fluid inlets and two heat exchanger fluid outlets of equal size whereas U.S. Pat. No. 9,683,481 has two heat exchanger fluid inlets and one heat exchanger fluid outlet.

In the embodiment of the dual, dual-pass intercooler assembly 400 shown in FIGS. 5-8, the initial air flow direction from the supercharger 145a underneath the dual, dual-pass intercooler assembly 400 is up. However, with reference to FIG. 9, in an alternative embodiment of the dual, dual-pass intercooler assembly 400, the initial air flow direction from the supercharger 145a above the dual, dual-pass intercooler assembly 400 is down, with the air continuing to flow back through the intercooler assembly 400 during a second pass, and then, cooled, the air travels along the runners 160a to the engine.

Figure 9:
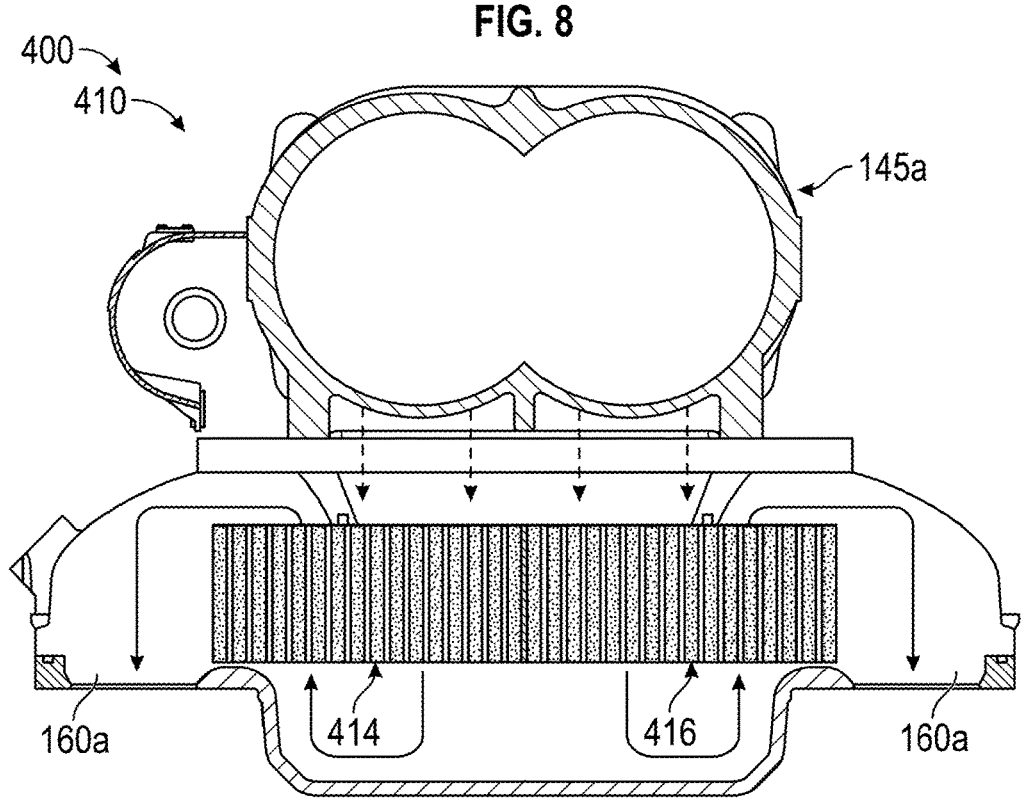
FIG. 9 is a cross-sectional view of another embodiment of a dual, dual-pass intercooler assembly of an intercooler supercharger system similar to the intercooler supercharger system shown in FIGS. 5-9, except the supercharger is above the intercooler assembly.
Figure 10:
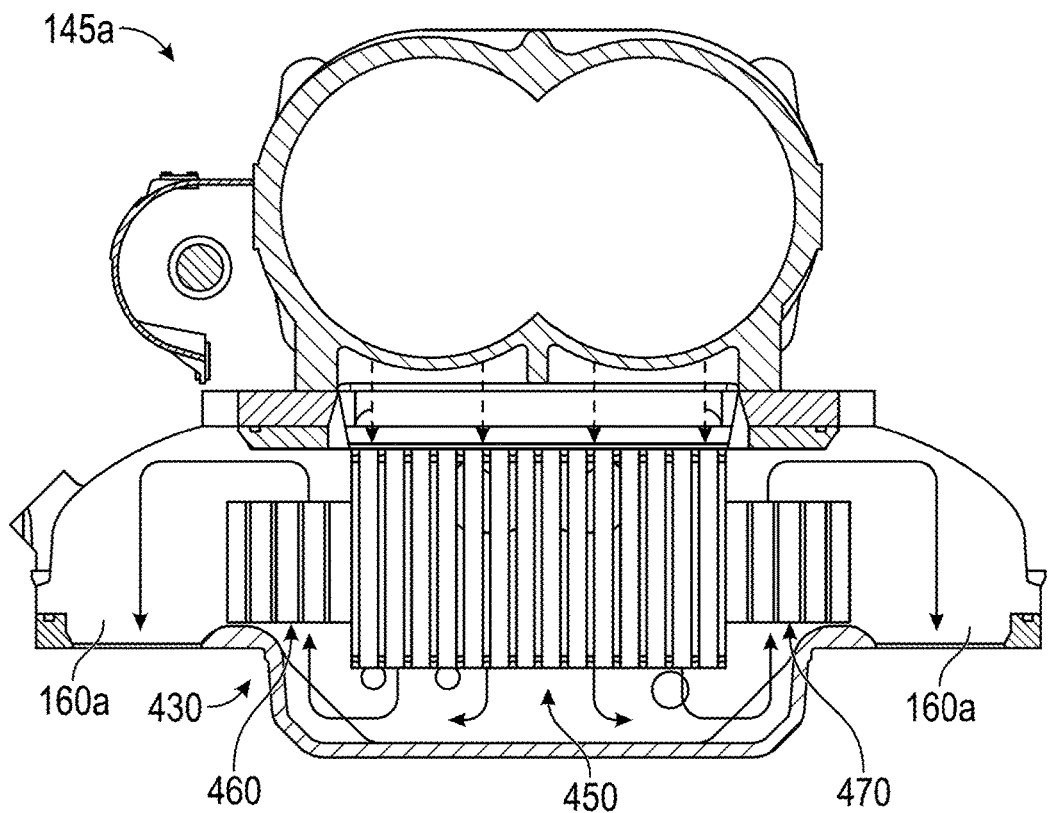
FIG. 10 is a cross-sectional view of a further embodiment of an intercooler assembly of an intercooler supercharger system where the supercharger is above the intercooler assembly, and the intercooler assembly includes three intercooler cores.
Figure 11:
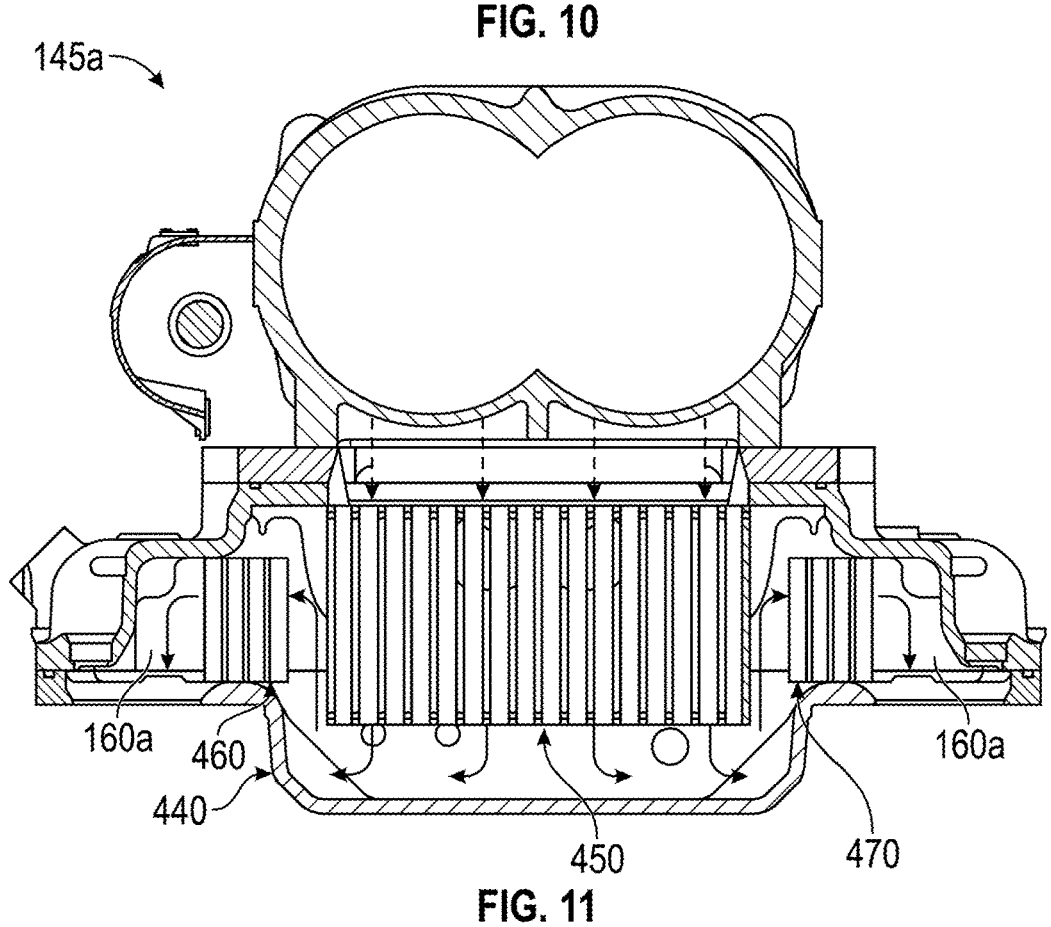
FIG. 11 is a cross-sectional view of a still further embodiment of an intercooler assembly of an intercooler supercharger system where the supercharger is above the intercooler assembly, and the intercooler assembly includes three intercooler cores.

FIGS. 10 and 11 show further embodiments of intercooler assemblies 430, 440 similar to FIG. 9 in that the initial air flow direction from the supercharger 145a above the intercooler assemblies 430, 440 is down, except the intercooler assemblies 430, 440 include three separate intercooler cores 450, 460, 470 with the initial air from the supercharger 145 flowing through intercooler core 450, and then out intercooler cores 460, 470 along the runners 160a to the engine.

In further embodiments of the intercooler assembly 400, an air inlet for the intercooler supercharger system 410 is in the front or the rear of the intercooler supercharger system 410.

Figure 5:
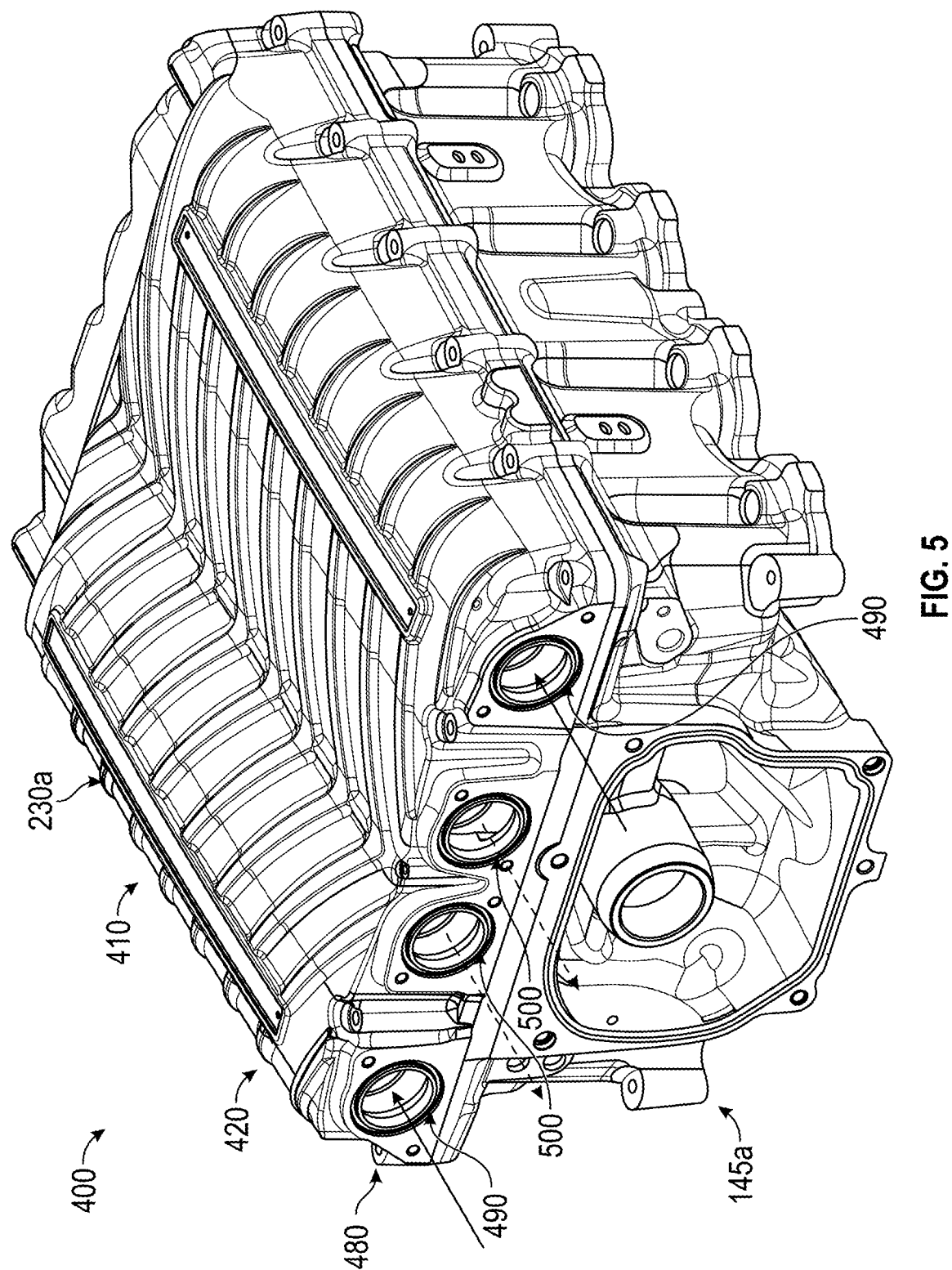
FIG. 5 is a perspective view of an embodiment of a dual, dual-pass intercooler assembly of an intercooler supercharger system.
Figure 6:
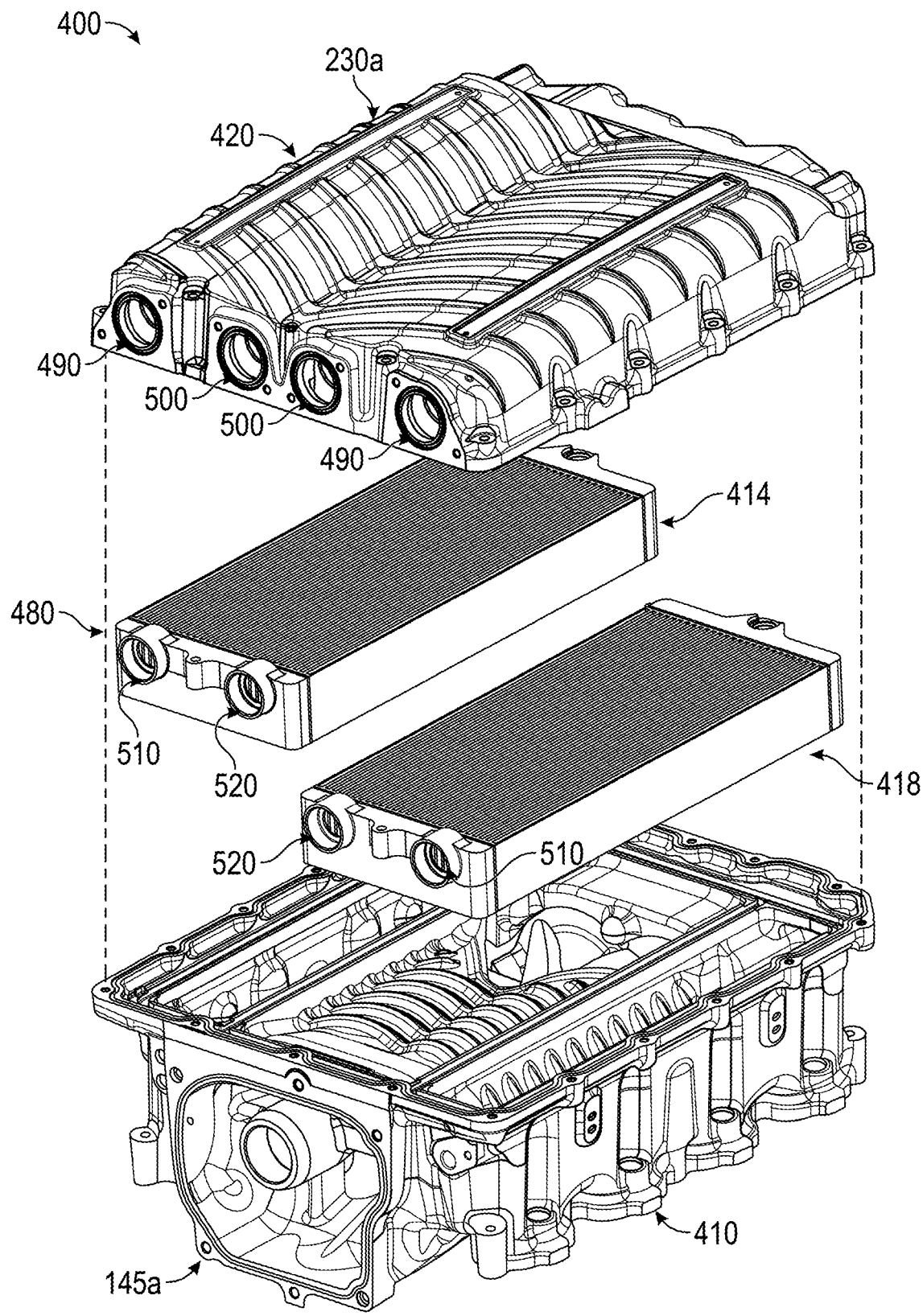
FIG. 6 is an exploded perspective view of the dual, dual-pass intercooler assembly of an intercooler supercharger system of FIG. 5.
Figure 7:
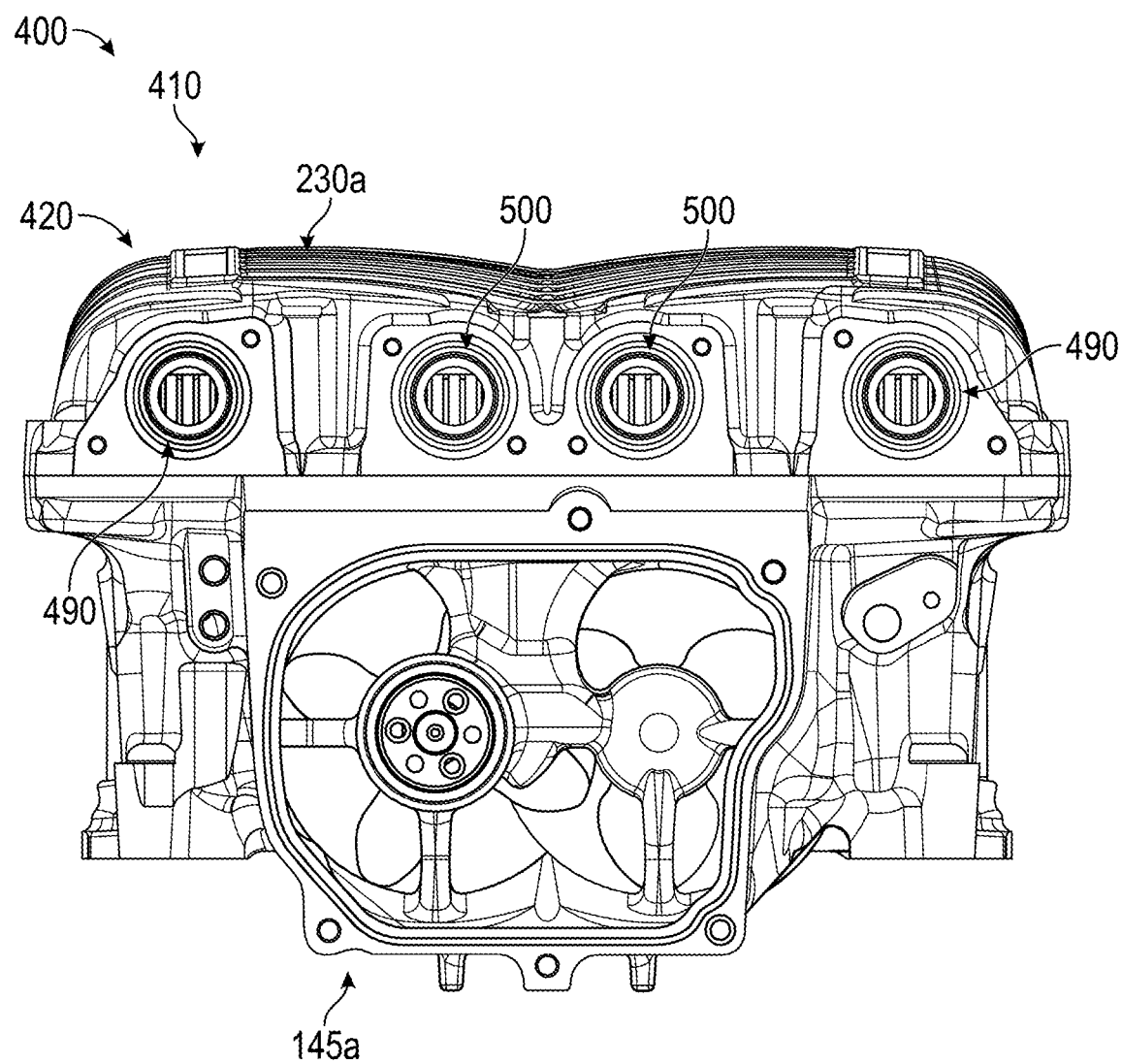
FIG. 7 is a front elevational view of the dual, dual-pass intercooler assembly of an intercooler supercharger system of FIG. 5.

With reference to FIGS. 5-7, the dual, dual-pass intercooler assembly 400 includes a heat exchange medium system 480 for transferring a heat exchange medium (e.g., water) there through for cooling the compressed air that passes through the intercooler assembly 400. The heat exchange medium system 480 includes two lid heat exchange medium inlets 490 and two lid heat exchange medium outlets 500. The intercooler cores 414, 418 include heat exchange medium inlets 510 coupled with the lid heat exchange medium inlets 490, and heat exchange medium outlets 520 coupled with the lid heat exchange medium outlets 500.

Similar to the heat exchange medium system 270, the heat exchange medium system 480 provides for simple water distribution in each core 414, 418 with the fluid transfer inside the supercharger 145a or lid 230a, eliminating the need for external water lines to transfer water from core to core or out of and back into the same core. Water flows through each core 414, 418 from the heat exchange medium inlets 490 to the heat exchange medium outlets 520, all internal to the supercharger 145a or lid 230a.

With reference to FIGS. 13A-13J, a further embodiment of an intercooler lid assembly 800 will be described. Elements in the intercooler lid assembly 800 that are similar to elements in the intercooler supercharger system 120 shown and/or described with respect to FIGS. 1-4 will be shown and/or described with like reference numbers, but with a "c" suffix. Further, the description of the methods of installing and using the intercooler supercharger system 120 shown and/or described with respect to FIGS. 1-4 is incorporated herein.

Figure 13A:
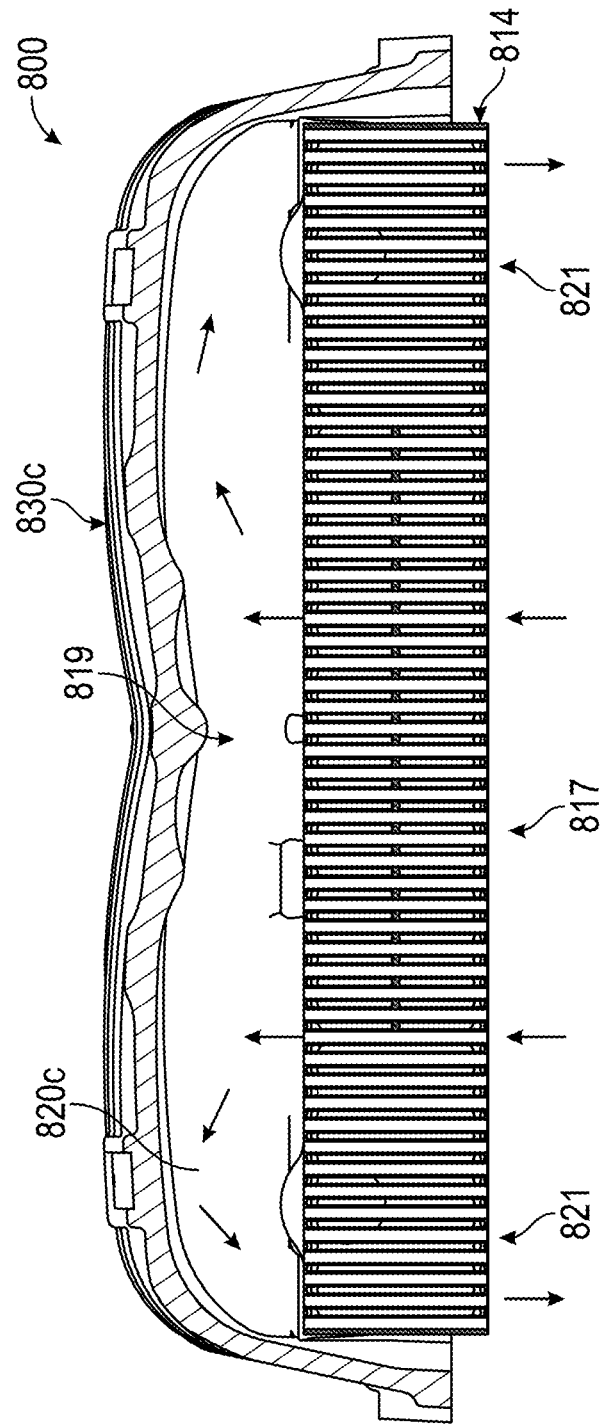
FIG. 13A is a front elevational view of a further embodiment of an intercooler lid assembly.
Figure 13B:
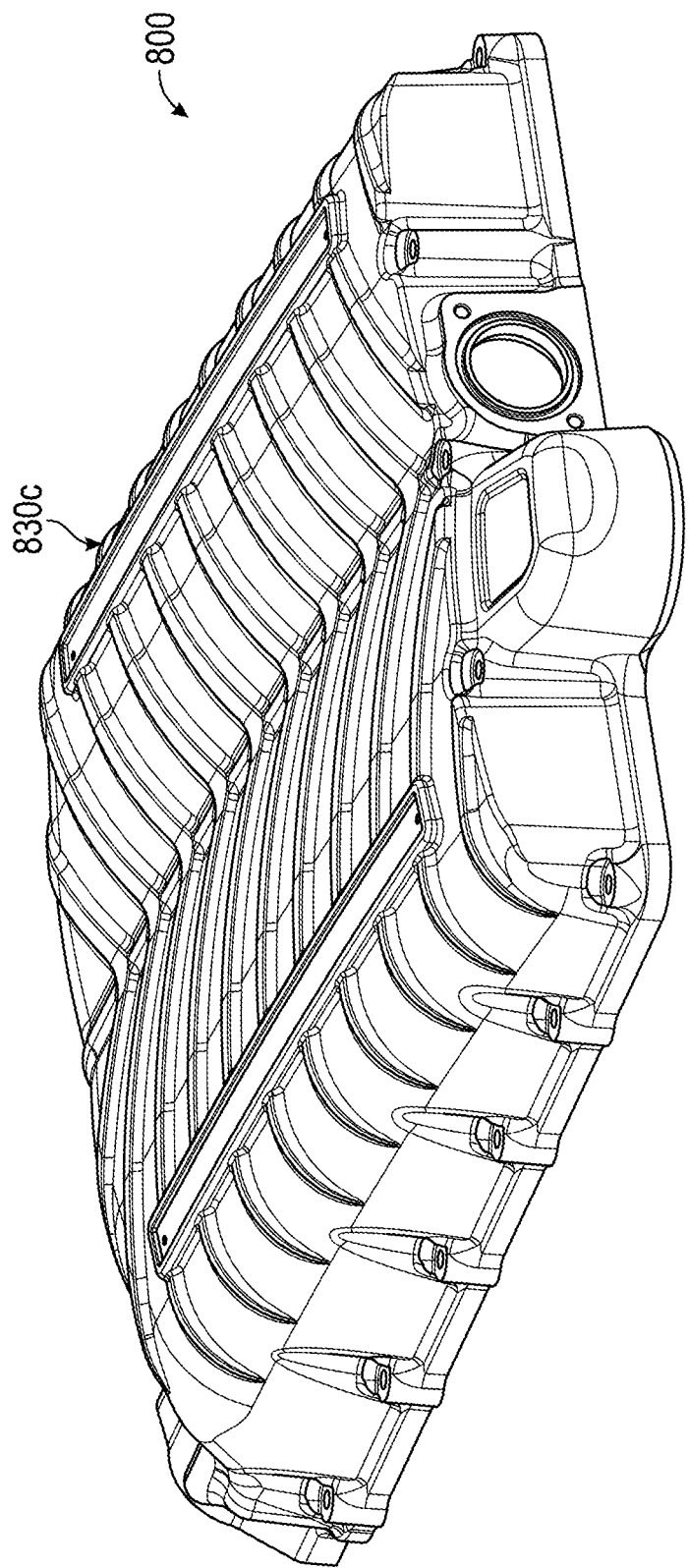
FIG. 13B is a perspective view of the intercooler lid assembly of FIG. 13A.
Figure 13C:
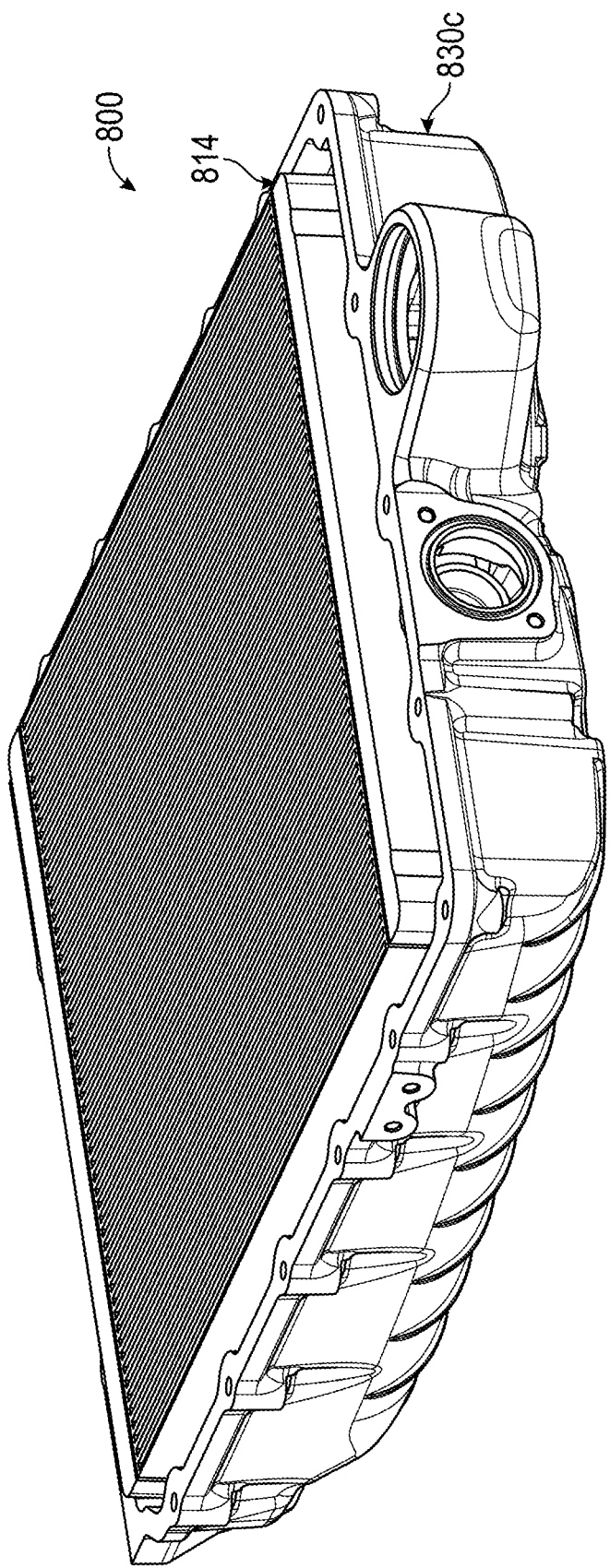
FIG. 13C is an upside-down front perspective view of the intercooler lid assembly of FIG. 13A.
Figure 13D:
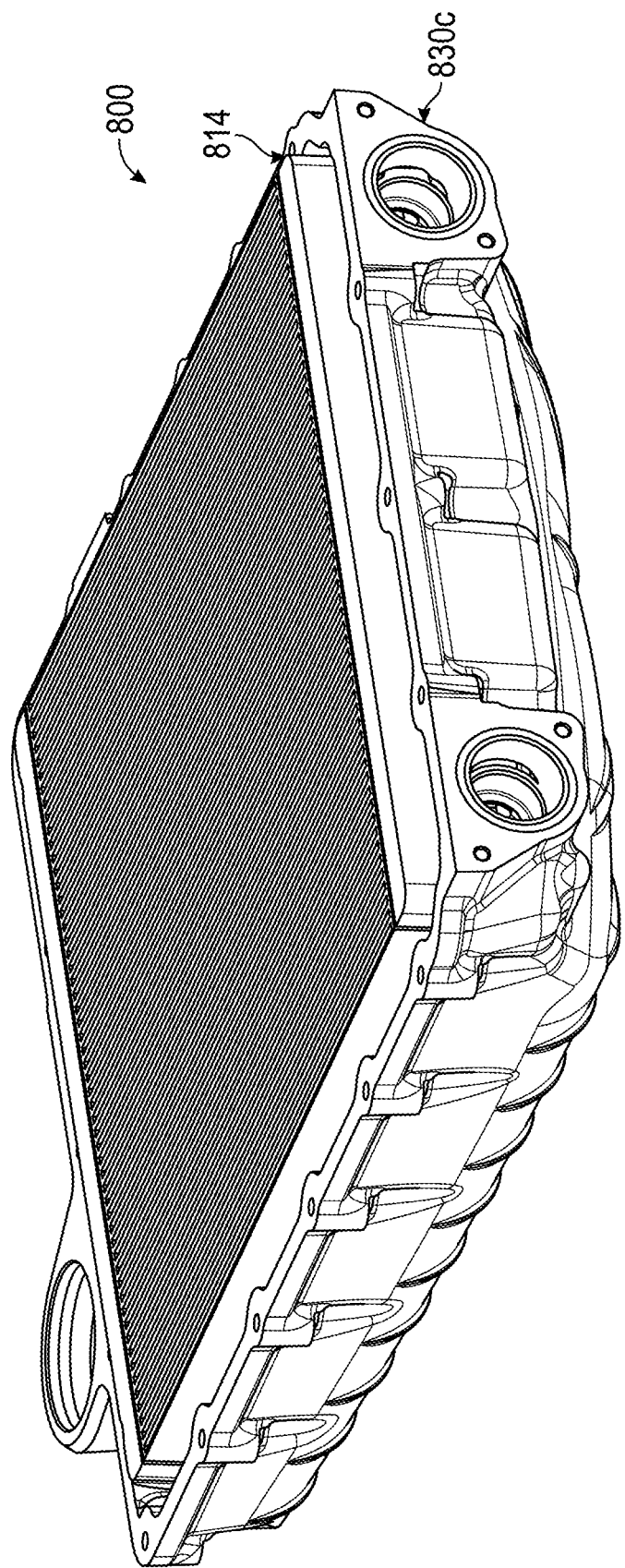
FIG. 13D is an upside-down rear perspective view of the intercooler lid assembly of FIG. 13A.
Figure 13E:
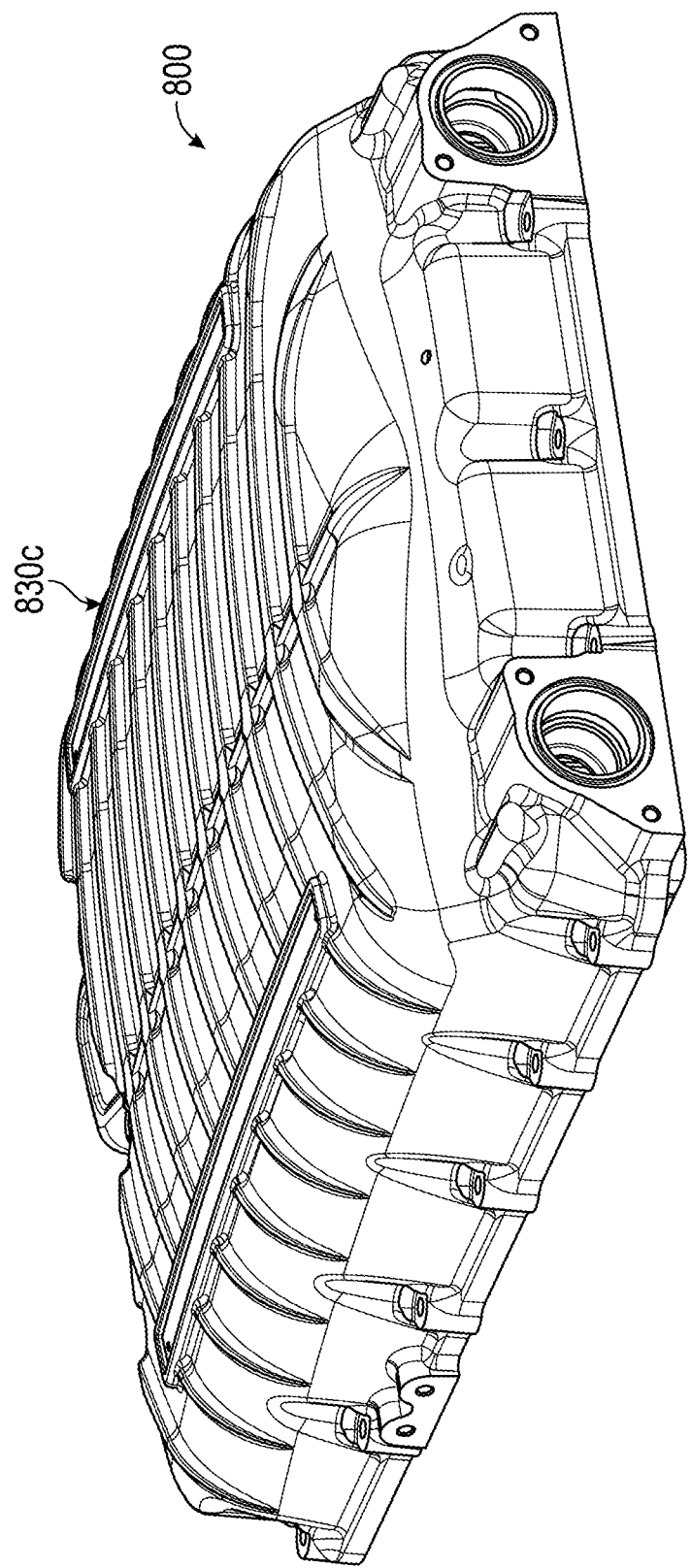
FIG. 13E is a perspective view of the intercooler lid assembly of FIG. 13A.
Figure 13F:
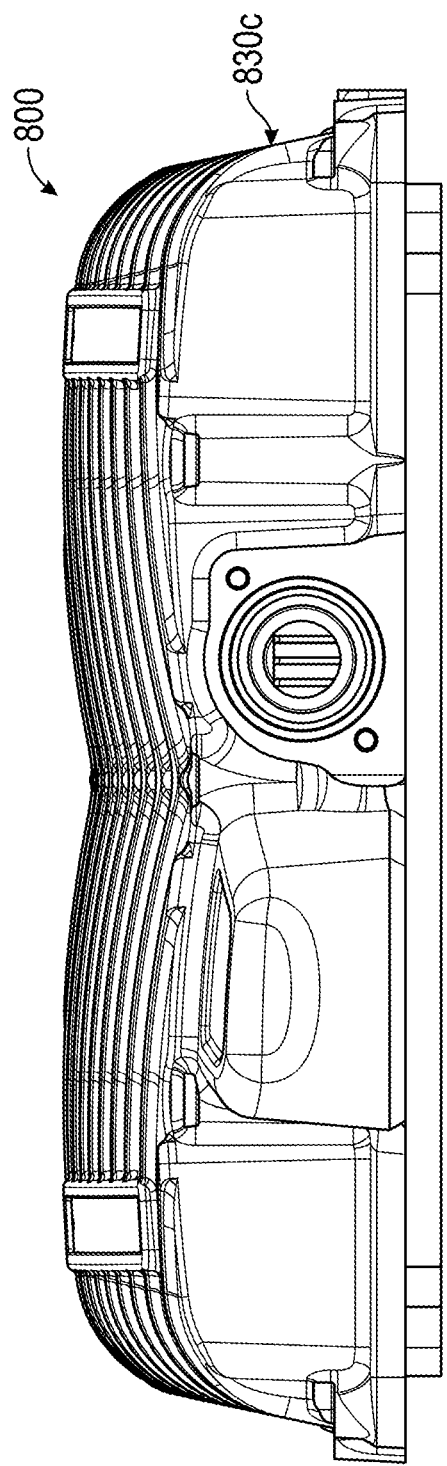
FIG. 13F is a front elevational view of the intercooler lid assembly of FIG. 13A.
Figure 13G:
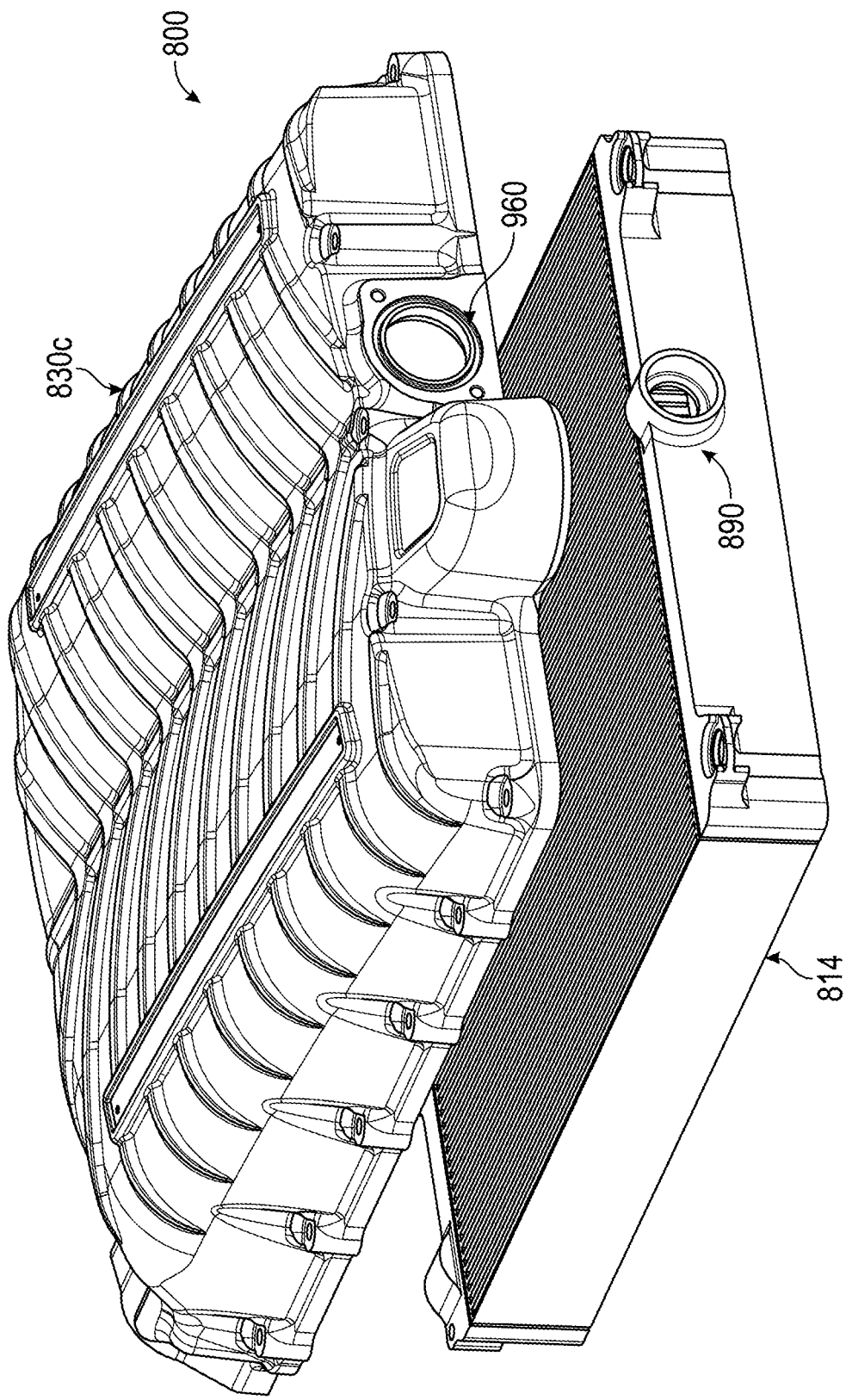
FIG. 13G is a perspective view of the intercooler lid assembly of FIG. 13A.
Figure 13H:
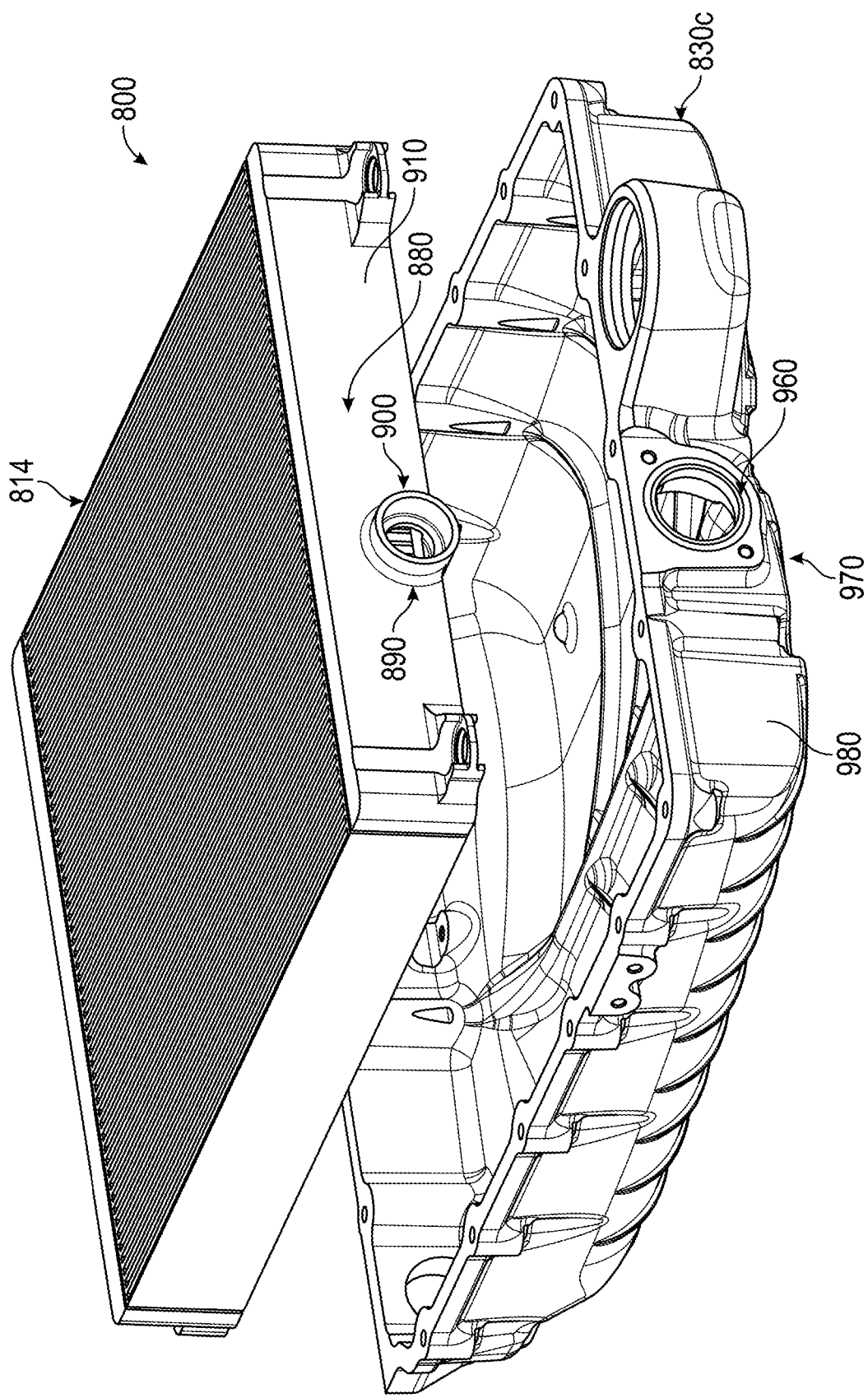
FIG. 13H is an upside-down front perspective view of the intercooler lid assembly of FIG. 13A.
Figure 13I:
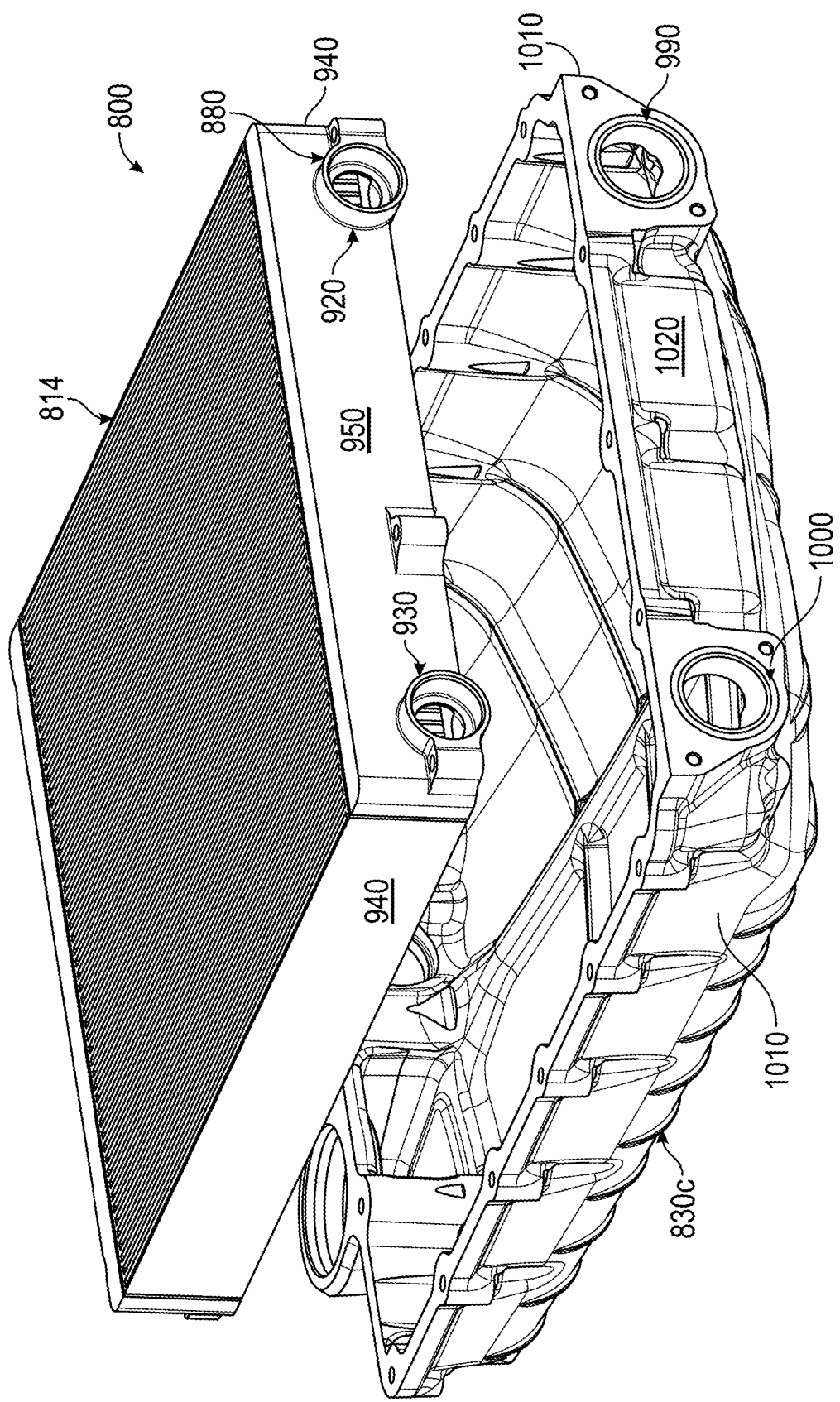
FIG. 13I is an upside-down rear perspective view of the intercooler lid assembly of FIG. 13A.
Figure 13J:
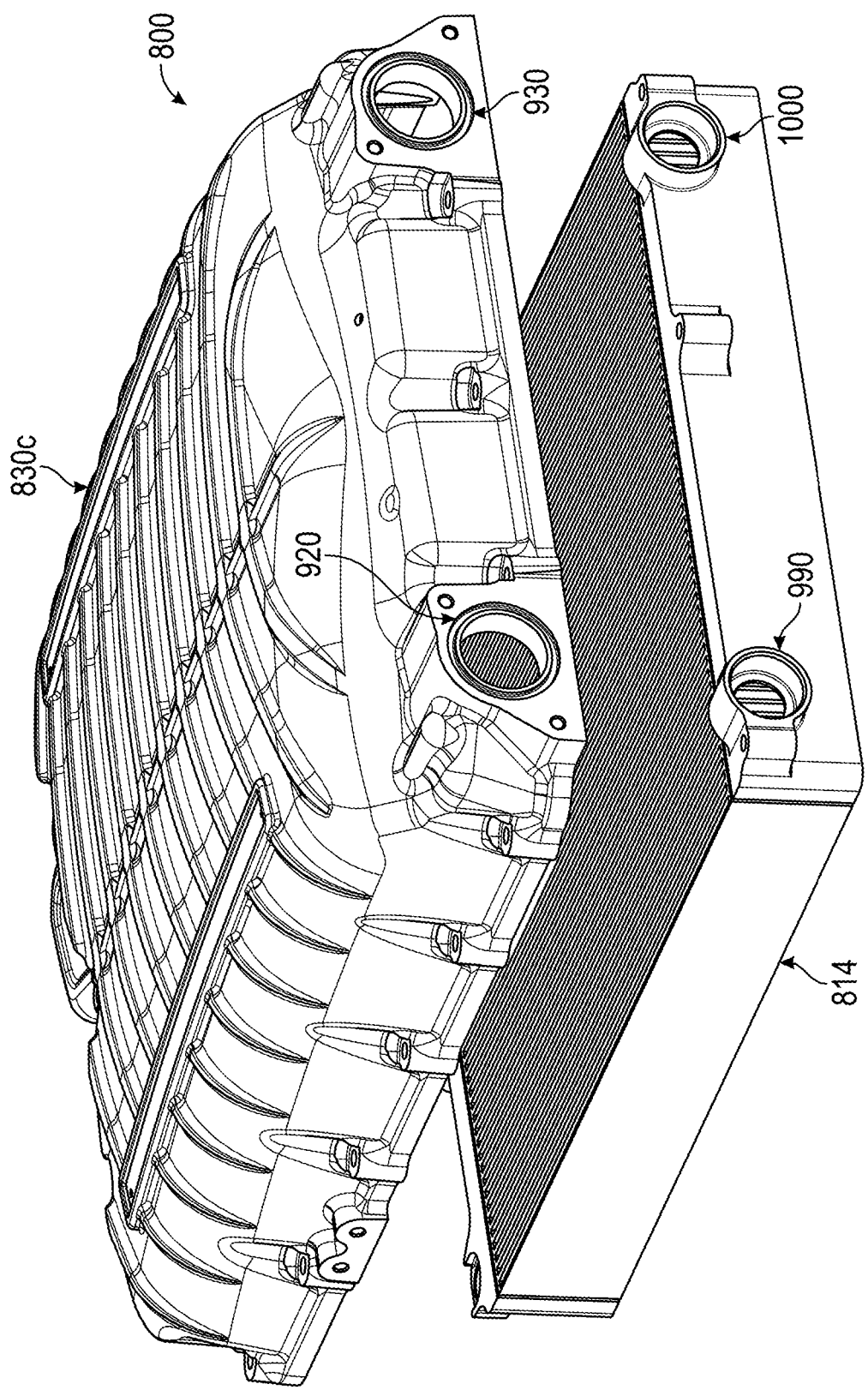
FIG. 13J is a rear perspective view of the intercooler lid assembly of FIG. 13A.

The intercooler lid assembly 800 includes a single intercooler core 814 that is mountable within lid 830c. As shown in FIG. 13A, the supercharger air flows upward through a central section 817, as shown. The supercharger air enters a central portion 819 of the lid chamber 820c. The supercharger air then reflects off of the lid 830c, and is directed downward, passing through spaced outer sections 821, which are single-pass, as shown. The intercooler lid assembly 800 forms a lid assembly, where the single core 814 is mounted in the lid 830c so that substantially all of the single core 814 is disposed in the lid 830c, and the lid 830c with single core 814 is mountable to a supercharger casing/housing. The core 814 may be sealed with silicone, O-rings, or a fabricated metal piece.

A heat exchange medium system 880 of the intercooler assembly 800 includes the intercooler core 814 with a single core heat exchange medium inlet port 890 in a central section 900 on a front end 910 and a pair of core heat exchange medium outlet ports 920, 930 adjacent to opposite sides 940 on a rear end 950. Similarly, the lid 830c includes a lid heat exchange medium inlet port 960 in a central section 970 on a front end 980 and a pair of lid heat exchange medium outlet ports 990, 1000 adjacent to opposite sides 1010 on a rear end 1020. In alternative embodiments, the heat exchange medium system 880 includes alternative numbers, locations, and/or configurations than that shown.

For example, as shown in FIGS. 13K-13N, instead of port 890 being an inlet port and ports 920, 930 being outlet ports, ports 920, 930 may be inlet ports and port 890 may be an outlet port.

Further and/or additionally, as shown in FIGS. 13K-13N, port 890 may be on a front end of the core 814 and ports 920, 930 may be on a rear end of the core 814 or port 890 may be on a rear end of core 814 and ports 920, 930 may be on a front end of the core 814.

Figure 13K:
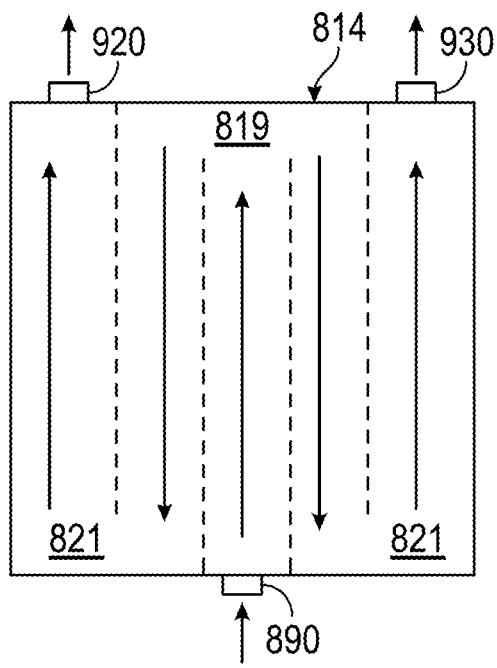
FIGS. 13K-13N are top views of alternative embodiments of a single intercooler core of an intercooler lid assembly.

As shown in FIG. 13K, if port 890 is an inlet port on the front of the core 814 and ports 920, 930 are outlet ports on the rear of the core 814, the central section 819 is a dual-pass heat exchanger fluid flow section with the heat exchanger fluid flowing initially from front to rear in a lower section 932 (see FIG. 13O), up, and then back from rear to front in upper section 934. The heat exchanger fluid then flows from front to rear in single-pass, spaced outer sections 821, and out of outlet ports 920, 930.

Figure 13L:
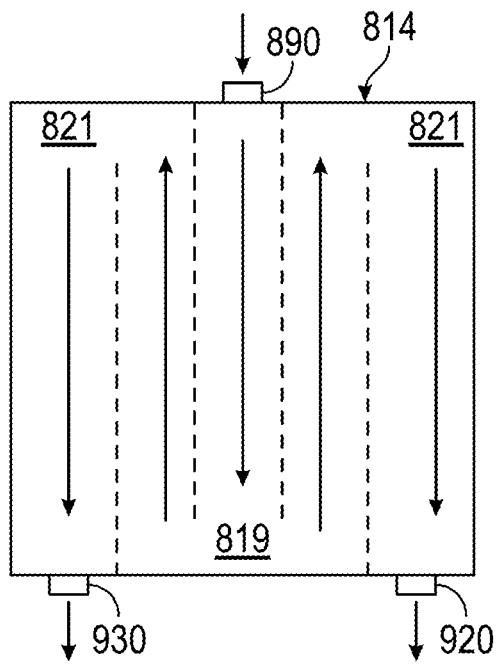

The flow path in the embodiment of FIG. 13L is similar to the flow path of the embodiment in FIG. 13K, except that inlet port 890 is on a rear end of core 814 and outlet ports 920, 930 are on a front end of the core 814.

Figure 13M:
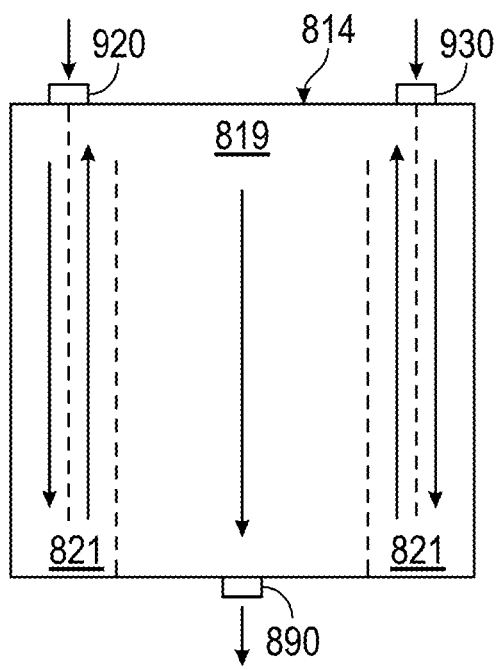
Figure 13N:
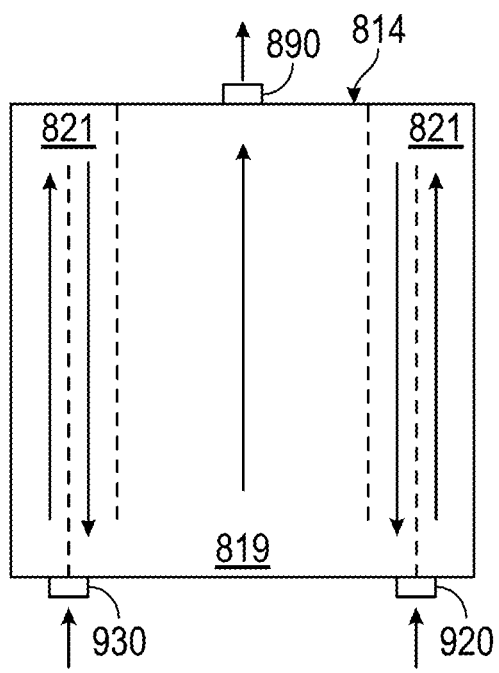
Figure 13O:
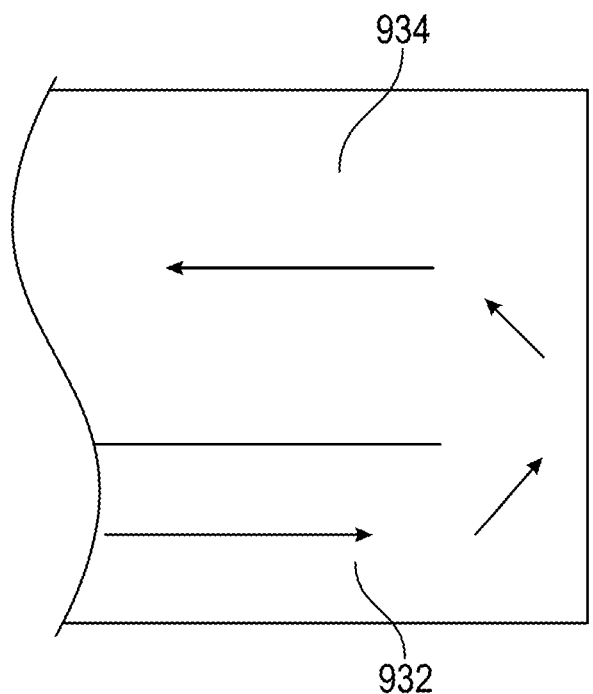
FIG. 13O is a side cross-sectional view of the single intercooler core of the embodiments of FIGS. 13K-13N and shows an upper heat exchanger fluid flow section and a lower heat exchanger fluid flow section.

As shown in FIG. 13M, if port 890 is an outlet port on the front of the core 814 and the ports 920, 930 are inlet ports on the rear of the core 814, the spaced outer sections 821 are dual-pass heat exchanger fluid flow sections with the heat exchanger fluid flowing initially from front to rear in a lower section similar to the lower section 932 shown in FIG. 13O, up, and then back from rear to front in an upper section similar to the upper section 934. The heat exchanger fluid then flows from front to rear in single-pass central section 819, and out of inlet ports 890.

The flow path in the embodiment of FIG. 13N is similar to the flow path of the embodiment in FIG. 13M, except that inlet ports 920, 930 are on a front end of core 814 and outlet port 890 is on a rear end of the core 814.

While various embodiments of the present invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

As will become apparent to one of ordinary skill in the art after reading this document, the illustrated embodiments and their various alternatives can be implemented without confinement to the illustrated examples.

We claim:

1. An intercooler lid assembly for an intercooler supercharger system, comprising:
    an intercooler lid mountable to a supercharger housing;
    one or more intercooler cores mounted within and to the intercooler lid;
    wherein the one or more intercooler cores configured to receive and cool supercharger air passing there through prior to receipt by an engine, the one or more intercooler cores are mounted to and within the intercooler lid to form a pre-assembled intercooler lid assembly mountable onto the supercharger housing to install the intercooler lid assembly, and the one or more intercooler cores configured to provide heat exchange fluid transfer there through to cool the supercharger air,
    wherein the one or more intercooler cores include a single intercooler core configured to receive and cool supercharger air upon a first pass there through and receive and further cool the supercharger air upon a second pass through the single intercooler core prior to receipt by an engine, and the single intercooler core includes a single-pass heat exchanger path central section and spaced dual-pass heat exchanger path outer sections that are spaced from each other by the single-pass heat exchanger path central section.

2. The intercooler lid assembly of claim 1, wherein the single intercooler core includes opposite sides, a front end with a central section including a single core heat exchange medium outlet port, and a rear end with a pair of core heat exchange medium inlet ports adjacent to the opposite sides.

3. The intercooler lid assembly of claim 1, wherein the single intercooler core includes opposite sides, a rear end with a central section including a single core heat exchange medium outlet port, and a front end with a pair of core heat exchange medium inlet ports adjacent to the opposite sides.

4. A method of installing the intercooler assembly of claim 1, comprising:
    pre-assembling the one or more intercooler cores substantially entirely within the intercooler lid by disposing the one or more intercooler lid upside down, lowering the one or more intercooler cores substantially entirely within the intercooler lid, and coupling the one or more intercooler cores to the intercooler lid within the intercooler lid to form the pre-assembled intercooler lid assembly;
    mounting the pre-assembled intercooler lid assembly onto the supercharger housing to install the pre-assembled intercooler lid assembly.

5. The method of claim 4, wherein the single intercooler core includes opposite sides, a front end with a central section including a single core heat exchange medium outlet port, and a rear end with a pair of core heat exchange medium inlet ports adjacent to the opposite sides.

6. The method of claim 4, wherein the single intercooler core includes opposite sides, a rear end with a central section including a single core heat exchange medium outlet port, and a front end with a pair of core heat exchange medium inlet ports adjacent to the opposite sides.

7. An intercooler supercharger system, comprising:
    the intercooler lid assembly of claim 1,
    a supercharger,
    wherein the one or more intercooler cores receive and cool compressed air from the supercharger and deliver the cool compressed air to an engine.

8. An intercooler lid assembly for an intercooler supercharger system, comprising:
    an intercooler lid mountable to a supercharger housing;
    one or more intercooler cores mounted within and to the intercooler lid;
    wherein the one or more intercooler cores configured to receive and cool supercharger air passing there through prior to receipt by an engine, the one or more intercooler cores are mounted to and within the intercooler lid to form a pre-assembled intercooler lid assembly mountable onto the supercharger housing to install the intercooler lid assembly, and the one or more intercooler cores configured to provide heat exchange fluid transfer there through to cool the supercharger air, wherein the one or more intercooler cores include a single intercooler core configured to receive and cool supercharger air upon a first pass there through and receive and further cool the supercharger air upon a second pass through the single intercooler core prior to receipt by an engine, and wherein the single intercooler core includes a lower section that heat exchanger fluid flows through in one direction and an upper section that heat exchanger fluid flows through in an opposite direction.

9. A method of installing the intercooler assembly of claim 8, comprising:
pre-assembling the one or more intercooler cores substantially entirely within the intercooler lid by disposing the one or more intercooler lid upside down, lowering the one or more intercooler cores substantially entirely within the intercooler lid, and coupling the one or more intercooler cores to the intercooler lid within the intercooler lid to form the pre-assembled intercooler lid assembly;
mounting the pre-assembled intercooler lid assembly onto the supercharger housing to install the pre-assembled intercooler lid assembly.

10. An intercooler supercharger system, comprising:
the intercooler lid assembly of claim 8,
a supercharger,
wherein the one or more intercooler cores receive and cool compressed air from the supercharger and deliver the cool compressed air to an engine.

\* \* \* \* \*